United States Patent
Mizoguchi

(10) Patent No.: US 7,184,579 B2
(45) Date of Patent: Feb. 27, 2007

(54) FINGERPRINT IDENTIFICATION SYSTEM

(75) Inventor: Masanori Mizoguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 380 days.

(21) Appl. No.: 10/055,926

(22) Filed: Jan. 28, 2002

(65) Prior Publication Data
US 2003/0091724 A1    May 15, 2003

(30) Foreign Application Priority Data
Jan. 29, 2001    (JP)    ............................. 2001-019983

(51) Int. Cl.
*G06K 9/00*    (2006.01)
*G06F 7/00*    (2006.01)

(52) U.S. Cl. .......................... 382/124; 340/5.83; 902/3

(58) Field of Classification Search ................ 382/115, 382/124–127; 356/71
See application file for complete search history.

(56) References Cited

U.S. PATENT DOCUMENTS

| 5,933,515 | A | | 8/1999 | Pu et al. |
| 5,963,656 | A | * | 10/1999 | Bolle et al. .................. 382/124 |
| 5,978,495 | A | * | 11/1999 | Thomopoulos et al. ..... 382/124 |
| 6,148,094 | A | | 11/2000 | Kinsella |
| 6,241,288 | B1 | * | 6/2001 | Bergenek et al. ............. 283/67 |
| 6,526,396 | B1 | * | 2/2003 | Hiratsuka et al. ............. 706/52 |
| 2001/0040988 | A1 | * | 11/2001 | Takahashi .................... 382/124 |
| 2002/0181749 | A1 | * | 12/2002 | Matsumoto et al. ......... 382/125 |

FOREIGN PATENT DOCUMENTS

| EP | 0 797 170 A1 | 9/1997 |
| JP | 1-217574 | 8/1989 |
| JP | H3-108076 A | 5/1991 |
| JP | 2680084 | 8/1997 |
| JP | 10-124668 A | 5/1998 |
| JP | H10-124668 A | 5/1998 |
| JP | H11-110541 A | 4/1999 |
| JP | 11-253426 A | 9/1999 |
| JP | H11-253426 A | 9/1999 |
| JP | 2000-194854 A | 7/2000 |
| JP | 2000-204803 A | 7/2000 |
| JP | 2000-222556 A | 8/2000 |
| WO | WO 00/46739 A1 | 8/2000 |
| WO | WO 01/330 A1 | 1/2001 |

OTHER PUBLICATIONS

Kazuharu Yamato, et al.: "Problems of Fingerprint Lookup Devices and How to Resolve Them," *Gazo Denshi Gakkaishi* [Journal of the Institute of Image Electronics Engineers of Japan], Japan, Institute of Image Electronics Engineers of Japan, Aug. 25, 1995, vol. 24, No. 4, p. 382-391.

L. Coetzee et al., "Fingerprint Recognition in Low Quality Images", Pattern Recognition, Pergamon Press Inc., vol. 26, No. 10, (Oct. 1, 1993), pp. 1441-1460 with Abstract.

* cited by examiner

*Primary Examiner*—Jingge Wu
*Assistant Examiner*—Charles Kim
(74) *Attorney, Agent, or Firm*—Sughrue Mion, PLLC

(57) ABSTRACT

The fingerprint identification system includes a fingerprint identification terminal having a function of receiving input of a plurality of fingerprint images taken from one target finger to select a fingerprint image suited for identification processing based on image quality determination and a fingerprint identification device having a function of outputting an identification result by selectively combining, for each image, one-to-N matching, one-to-one matching, fusion score calculation from a plurality of scores and condition determination of an identification score and a fusion score.

26 Claims, 15 Drawing Sheets

FINGERPRINT IDENTIFICATION SYSTEM

BACKGROUND OF THE INVENTION

1. Field of the Invention

The present invention relates to a system for personal discrimination and personal identification of a person and, more particularly, to a fingerprint identification system conducting fingerprint identification with higher precision than by conventional systems by using a plurality of fingerprint images at the time of personal discrimination and identification making the use of fingerprints.

2. Description of the Related Art

In recent years, they are well known techniques that personal identification can be made using fingerprints and that an individual can be searched using a large number of fingerprint images which are made into a data base in advance by computer processing or using a feature vector which characterizes the fingerprint images.

In general, such technique is called a fingerprint identification system or an AFIS (Automated Fingerprint Identification System) which is used in identification work by police.

For taking fingerprints of an individual to be personally inquired, it is a conventional practice to imprint his or her fingerprints on paper sheet with ink. Technique has been widespread of taking fingerprint images as digital images directly into a computer by a live fingerprint scanner (or live scanner for short) in real time.

Widely used as a live scanner for taking fingerprint images from fingerprints is a system which takes differences in a light reflected on a prism surface caused by irregularities of ridge lines of fingerprints as variable-density images by means of an optical system.

Various kinds of live fingerprint sensors have been also recently invented and put on the market including a capacitance type fingerprint sensor with numbers of minute electrodes arranged two-dimensionally on a sensor surface for detecting a difference in capacitance generated by irregularities of ridge lines of a fingerprint in contact with the electrode to obtain fingerprint images, a thermal sensor type fingerprint sensor for detecting a difference in temperature caused by the contact between a sensor surface and irregularities of fingerprint ridge lines and an electric field strength type fingerprint sensor for detecting a difference in electric field strength generated by irregularities of fingerprint ridge lines as a result of causing electric field on a finger by electromagnetic wave.

Any of the above-described systems enables fingerprint images to be directly taken into a computer only by brining fingerprints into contact with a live fingerprint sensor surface.

Use of these live fingerprint scanners enables high-speed processing of personal identification using fingerprints.

Also conducted in recent years is to transfer data of fingerprint images taken by means of a fingerprint scanner disposed at a remote place through remote access to a finger print identification sensor via a network and return identification results via the network. While it is possible to send fingerprint images themselves, because images have a large volume of data and because data of ten fingers should be sent for improving identification precision in some cases, a system is also used of sending not an image itself but results obtained by extracting features of fingerprints from an image to a fingerprint identification center (in some cases, images are sent together).

In this case, when sending only a feature vector of fingerprint images, because original fingerprint images exist on the input side, if visual confirmation of the fingerprint images by naked eyes is necessary, the processing will be conducted at a remote place where the fingerprints are input.

On the other hand, use of radio communication has been facilitated nowadays to enable the above-described remote access to be realized by so-called mobile communication.

Under these circumstances, there arises a policeman's need of carrying a mobile communication type fingerprinting device to call on a fingerprint identification center to collate fingerprints on the spot where a person's fingerprints are taken by means of radio communication.

Because a heavily-mounted patrol car is already equipped with radio communication apparatus and also because an information communication terminal using a computer mounted on a car has been widely used, use of a fingerprint identification system in combination with these apparatuses is also demanded.

This enables, for example, criminal histories to be searched and registered personal belongings such as a car to be confirmed using results of fingerprint identification of fingerprint images of a person to be searched.

It is also pointed out that even when an identification score is not sufficient for satisfactorily identifying an individual and, when returning a mug shot of a person whose score is large to a terminal on the spot for deliberate confirmation, this enables a policeman who is not a specialist of fingerprints to identify a person in question with ease.

It is said that such a fingerprint identification system as described above enables detection of a false driver's license, for example.

Results of fingerprint identification is in general represented as an identification score which expresses similarity of fingerprints as a numeric value.

Therefore, when an identification score is extremely large, personal discrimination and identification can be made with high precision even by a single finger.

In order to reduce errors in fingerprint identification, it is as a matter of course possible to check whether fingerprints of a plurality, for example, two including a forefinger and a middle finger or three including the two and a thumb, of fingers of each person all have a large identification score or not.

Even from the same finger of the same person, a large identification score can not be always obtained because of rough skin, injury and fingerprinting being taken out of place and noise. In view of this fact, use of a plurality of different kinds of fingers whose identification processing is possible is useful.

At a patrol spot, it is assumed that when taking fingerprints from a suspicious person, he or she might not be cooperative.

It is also pointed out that in a case where general policemen use the system, even if they are trained to take fingerprints, they will have difficulties in taking as high quality fingerprint images as those taken by specialists in identification.

In other words, demanded is a remote-access type or in particular, mobile communication type fingerprint identification system enabling everybody to take as high quality fingerprint images as possible with relative ease to realize fingerprint identification with high precision using the taken fingerprint images although training for operating the system is required to some extent.

On the other hand, in order to obtain identification results of high quality fingerprint images, as to the use of a plurality of fingerprint images of the same finger, proposals are made in two aspects.

First is taking a plurality of images into a processing device in order to determine, when an imprinting area is increased in time series at the fingerprinting on a live fingerprint sensor, whether the imprinting area becomes a sufficient area.

In this case, since clear images with excellent contrast can not be obtained unless an area and imprinting pressure are sufficient, a mean density, variance, a maximum value, a difference between a maximum value and a minimum value and the like are often used as statistic property of each pixel within a screen.

Moreover, for example, Japanese Unexamined Patent Publication (Kokai) No. Heisei 1-217574, entitled "Device for Collating Principal" obtains stable fingerprint images without blur by the provision of a means for storing a plurality of so-called frame image series succeeding one after another in time series and determining whether a finger has moved or not and a means for presenting alarm when it is determined that the finger is moving.

In Japanese Patent No. 2680084 entitled "Personal Identification Device", aiming at obtaining a stable feature vector, at the time of registration to a fingerprint DB (data base), a plurality of fingerprints are imprinted with a feature point whose occurrence frequency is high weighed.

Also here, a plurality of images are taken from the same finger, which is the arrangement at the time of generating registered images that is made regarding a feature point occurring in every frame in time series as being important.

These conventional techniques are all premised on that one high quality image or one set of feature vectors equivalent to the same is ultimately extracted.

Second aspect relates to identification precision.

Commonly used as criteria for comparing so-called identification precision of patterns in a case of fingerprint identification have two kinds, a false match rate (FMR) which is a rate of determining that a fingerprint image of other finger is that of the same finger and a false non match rate (FNMR) of determining that a fingerprint image of the same finger is that of other finger.

Here, it is known and important that an FMR and an FNMR have a trade-off relationship.

More specifically, setting for improving an FMR (reducing FMR) in order to exclude erroneous acceptance of others conversely leads to an increase in an FNMR of determining that a person in question is other person.

At present there exists a system for ensuring security by using fingerprint identification, which conducts, for example, user authentication at opening and closing of a door and computer log-in by fingerprint identification.

In a case where such a system as described above with low identification precision is used, however, setting the FMR to be low so as to increase probability that other person will be erroneously accepted as a registered person results in an increase in the FNMR as a by-product to make even a person in question be hardly accepted as he/she is.

Known technique as a countermeasure is imprinting a plurality of fingerprints of the same finger and when at least one of the fingerprints has a large identification score, passing a person in question.

In this case, the countermeasure is characterized in using an identification score of a plurality of fingerprint images of the same finger based on the fact that "at least one of a plurality of images has a large identification score".

Conventional art thus aims at taking one fingerprint image of highest quality according to the first aspect.

This is thought to take communication costs and feature extraction processing costs into consideration.

However, recent increase in a band width of communication paths, possibility of large volume of data communication and realization of high-speed processing and parallel processing at low costs because of development of semiconductor techniques make constraint of "only one highest quality image" be not always necessary.

According to the second aspect, conventional art requires at least one high-quality image usable among a plurality of images.

In this case, however, it is constrained that at least one of them should have very high quality and a large identification score.

Therefore, as described above, there are needs of a technique of taking high-quality fingerprint images and an identification method which facilitate fingerprinting even when a person is not cooperative in taking his/her fingerprint images and which can be used with simple training.

SUMMARY OF THE INVENTION

Under these circumstances, an object of the present invention is to provide a system for conducting highly precise identification by taking a plurality of fingerprint images from the same finger, selecting as good quality fingerprint image as possible among them even if not all of them have enough quality and combining a plurality of identification scores obtained from the respective fingerprint images.

With this arrangement, the present invention enables mitigation of constraint that at least one of a plurality of fingerprint images should have an extremely large score.

Another object of the present invention is to provide a highly precise identification system using a combination of identification scores of a plurality of fingerprint images taken from the same finger to enable an applicable range to be expanded to identification of fingerprint images whose quality is not good.

A further object of the present invention is to provide a system for conducting identification using a plurality of different kinds of fingers in order to enable highly precise identification to be conducted efficiently at a large-scale DB in addition to the above-described system using a plurality of images per finger.

According to one aspect of the invention, A fingerprint identification system for conducting identification of fingerprints using fingerprint images, comprises a fingerprint identification device for conducting fingerprint identification based on first feature vector data obtained by extracting features of a fingerprint from a fingerprint image, and a fingerprint identification terminal for transmitting a fingerprint image or the first feature vector data of the fingerprint image to the fingerprint identification device remotely disposed and receiving an identification result from the fingerprint identification device, wherein the fingerprint identification terminal receives input of a plurality of fingerprint images for one finger, calculates image quality of the fingerprint image to rearrange the plurality of fingerprint images based on the image quality, and transmits the first feature vector data of the fingerprint images rearranged to the fingerprint identification device, and the fingerprint identification device receives input of the first feature vector data of the plurality of fingerprint images for one finger and collates the first feature vector data of the plurality of fingerprint images with second feature vector data of a plurality of fingerprint images stored in a fingerprint data base to conduct fingerprint identification determination based on a plurality of identification scores corresponding to the respective second feature vector data which are obtained from the matching result.

In the preferred construction, the fingerprint identification terminal includes a scanner interface unit having a function of receiving input of a plurality of fingerprint images per finger from an external fingerprint scanner device, a main memory for holding the plurality of fingerprint images, and a main control unit for calculating image quality of each of the plurality of fingerprint images held in the main memory, ranking the plurality of fingerprint images in the main memory in descending order of quality and selecting a preset number of high-quality images to calculate first feature vector data of a fingerprint from the selected fingerprint image.

In the preferred construction, the fingerprint identification terminal includes a communication input/output control unit having a function of sending the selected fingerprint image or the first feature vector data of the image to the fingerprint identification device and a function of receiving identification result data returned from the fingerprint identification device.

In the preferred construction, the fingerprint identification terminal includes a console display unit capable of displaying any of confirmation indication, processing state indication and fingerprint identification processing result indication of the plurality of fingerprint images stored in the main memory or an arbitrary combination of these indications, and an input unit for receiving input for changing a display method of the console display unit and changing condition data for use in fingerprint identification which is set in advance in the processing of the main control unit.

In the preferred construction, the fingerprint identification device receives input of feature vector data of each of the plurality of fingerprint images for one finger, and following a procedure predetermined according to the order of fingerprint image quality corresponding to each the fingerprint image, selects execution of either one-to-N matching or one-to-one matching between the first feature vector data and the second feature vector data, executes the selected matching processing, selects first feature vector data of a fingerprint image to be targeted next based on the determination whether each matching result satisfies preset conditions or not and repeats either one-to-N or one-to-one matching of the first feature vector data with the second feature vector data to output an identification result of the plurality of fingerprint images.

In the preferred construction, the fingerprint identification terminal includes a scanner interface unit having a function of receiving input of a plurality of fingerprint images per finger from an external fingerprint scanner device, a main memory for holding the plurality of fingerprint images, and a main control unit for calculating image quality of each of the plurality of fingerprint images held in the main memory, ranking the plurality of fingerprint images in the main memory in descending order of quality and selecting a preset number of high-quality images to calculate first feature vector data of a fingerprint from the selected fingerprint image, and the fingerprint identification device receives input of feature vector data of each of the plurality of fingerprint images for one finger, and following a procedure predetermined according to the order of fingerprint image quality corresponding to each the fingerprint image, selects execution of either one-to-N matching or one-to-one matching between the first feature vector data and the second feature vector data, executes the selected matching processing, selects first feature vector data of a fingerprint image to be targeted next based on the determination whether each matching result satisfies preset conditions or not and repeats either one-to-N or one-to-one matching of the first feature vector data with the second feature vector data to output an identification result of the plurality of fingerprint images.

In the preferred construction, the fingerprint identification device receives input of the first feature vector data of each of the plurality of fingerprint images for one finger and conducts one-to-N matching of all of the first feature vector data with the second feature vector data to select only the identification scores that satisfy preset conditions starting with a score having the largest value, conducts fusion operation of the selected identification score with identification scores corresponding to a plurality of feature vector data of the same finger to calculate a fusion score, and outputs an identification result based whether the fusion score satisfies preset identification conditions.

In the preferred construction, the fingerprint identification device receives input of each feature vector data of a plurality of fingerprint image data for each of a plurality of fingers to output an identification result with a representative score calculated from the feature vector data of the plurality of fingerprint images of each finger in combination with a result of whether the representative score of each finger satisfies preset conditions.

In the preferred construction, the fingerprint identification device receives input of each feature vector data of a plurality of fingerprint image data for each of a plurality of fingers to obtain a representative score calculated from the feature vector data of the plurality of fingerprint images of each finger, and calculates a fusion score based on the representative score of each finger to output a result of whether the fusion score satisfies preset identification conditions as an identification result.

According to the second aspect of the invention, a fingerprint identification method of conducting identification of fingerprints based on fingerprint images, comprising the steps of at the fingerprint identification terminal, receiving input of a plurality of fingerprint images for one finger, calculating image quality of the fingerprint image to rearrange the fingerprint images based on the image quality, and extracting first feature vector data of the fingerprint images rearranged to transmit the data to the fingerprint identification device, and at the fingerprint identification device, receiving input of the first feature vector data of the plurality of fingerprint images for one finger, collating the first feature vector data of the plurality of fingerprint images with second feature vector data of a plurality of fingerprint images stored in a fingerprint data base, and conducting fingerprint identification determination based on a plurality of identification scores corresponding to the respective second feature vector data which are obtained from the matching result.

In the preferred construction, the fingerprint identification terminal receives and displays identification result data of the fingerprint images obtained by the fingerprint identification device.

In the preferred construction, the fingerprint identification terminal, receives input of a plurality of fingerprint images per finger from an external fingerprint scanner device by a scanner interface unit, holds the plurality of fingerprint images in a main memory, calculates image quality of each of the plurality of fingerprint images held in the main memory, ranks the plurality of fingerprint images in the main memory according to the quality in descending order of quality to select a preset number of high-quality images, calculates first feature vector data of a fingerprint from the selected fingerprint image and sends the selected fingerprint image or the first feature vector data of the image to the fingerprint identification device, and receives identification result data returned from the fingerprint identification device.

In the preferred construction, the fingerprint identification device receives input of feature vector data of each of the plurality of fingerprint images for one finger, and following a procedure predetermined according to the order of fingerprint image quality corresponding to each the fingerprint image, selects execution of either one-to-N matching or one-to-one matching between the first feature vector data and the second feature vector data, executes the selected matching processing to select first feature vector data of a fingerprint image to be targeted next based on the determination whether each matching result satisfies preset conditions or not, and repeats either one-to-N or one-to-one matching of the first feature vector data with the second feature vector data to output an identification result of the plurality of fingerprint images.

In the preferred construction, the fingerprint identification device receives input of the first feature vector data of each of the plurality of fingerprint images for one finger and conducts one-to-N matching of all of the first feature vector data with the second feature vector data to select only the identification scores that satisfy preset conditions starting with a score having the largest value, conducts fusion operation of the selected identification score with identification scores corresponding to a plurality of feature vector data of the same finger to calculate a fusion score, and outputs an identification result based whether the fusion score satisfies preset identification conditions.

In the preferred construction, the fingerprint identification device receives input of each feature vector data of a plurality of fingerprint image data for each of a plurality of fingers to output an identification result with a representative score calculated from the feature vector data of the plurality of fingerprint images of each finger in combination with a result of whether the representative score of each finger satisfies preset conditions.

In the preferred construction, the fingerprint identification device receives input of each feature vector data of a plurality of fingerprint image data for each of a plurality of fingers to obtain a representative score calculated from the feature vector data of the plurality of fingerprint images of each finger, and calculates a fusion score based on the representative score of each finger to output a result of whether the fusion score satisfies preset identification conditions as an identification result.

According to another aspect of the invention, a fingerprint identification program for conducting identification of fingerprints based on fingerprint images by the control of a computer, which causes the fingerprint identification terminal to execute the functions of receiving input of a plurality of fingerprint images for one finger, calculating image quality of the fingerprint image to rearrange the fingerprint images based on the image quality, and extracting first feature vector data of the fingerprint images rearranged to transmit the data to the fingerprint identification device, and the fingerprint identification device to execute the functions of:

receiving input of the first feature vector data of the plurality of fingerprint images for one finger, collating the first feature vector data of the plurality of fingerprint images with second feature vector data of a plurality of fingerprint images stored in a fingerprint data base, and conducting fingerprint identification determination based on a plurality of identification scores corresponding to the respective second feature vector data which are obtained from the matching result.

The above-described fingerprint identification terminal executes operation of selecting a predetermined number of images from among given fingerprint images in descending order of image quality.

The fingerprint identification device obtains a plurality of identification scores from a given plurality of fingerprint images based on comparison between a feature vector of each of the fingerprint images and a feature vector of a fingerprint registered in advance at a fingerprint data base to ultimately execute output of one identification result by the processing of combining results of whether each identification score satisfies predetermined conditions or not, or depending whether a fusion score calculated from the respective identification scores satisfies predetermined conditions.

Accordingly, although use of a plurality of fingerprint images per finger increases processing costs, the present invention allows a range of image quality enabling identification to be enlarged more than that by conventional systems even when only an image of bad quality is obtained, and enables personal discrimination with more ease using highly precise fingerprints than conventional art even when a person whose fingerprint is to be taken is uncooperative in fingerprinting or when no specialist in identification is at the spot of taking fingerprint images.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
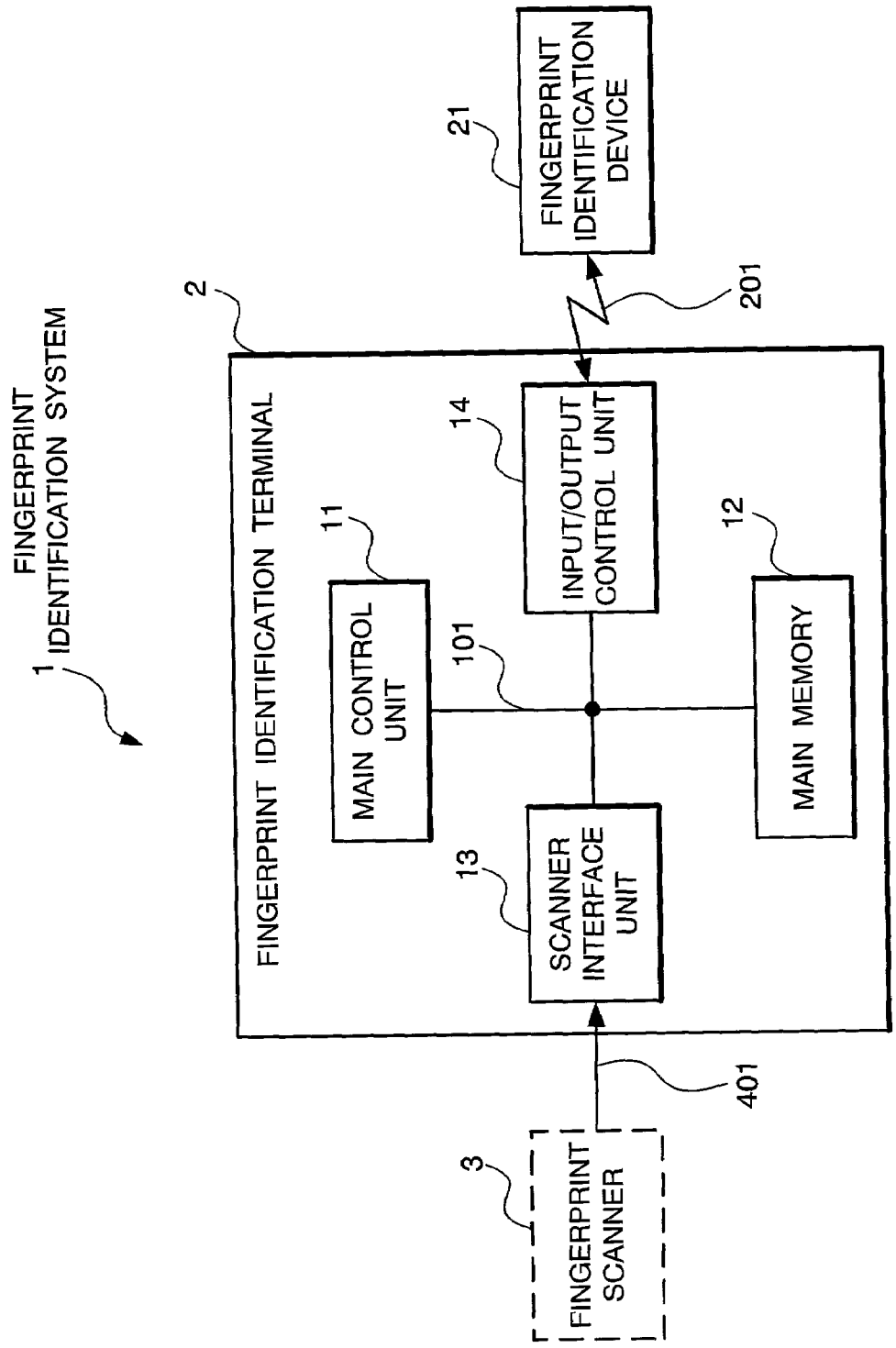
FIG. 1 is a block diagram showing an example of a structure of a fingerprint identification system according to one embodiment of the present invention.

FIG. 1 is a block diagram showing a structure of a fingerprint identification system according to one embodiment of the present invention. In the figure, a fingerprint identification system 1 using a plurality of images includes a fingerprint identification terminal 2 and a fingerprint identification device 21 in a fingerprint identification center.

The fingerprint identification terminal 2 is composed of a main control unit 11, a main memory 12, a scanner interface unit 13 and a communication input/output control unit 14 which are connected through a bus 101.

The scanner interface unit 13 is an interface unit for applying fingerprint image data made up of a plurality of fingerprint images per finger or a plurality of image data of each of a plurality of kinds of fingers from an external fingerprint scanner 3 to the main memory 12.

The main control unit 11 is connected to the external fingerprint scanner 3 through the scanner interface unit 13 by means of a data transfer path 401.

Then, the fingerprint scanner 3 transmits and receives fingerprint image data and a control signal to/from the scanner interface unit 13 by radio or wired communication as the communication path 401. Used here for radio communication is a low-power radio communication means such as a radio LAN or a Blue-Tooth and used for wired communication are RS232C, USB and a dedicated signal line.

Furthermore, fingerprint images read by the fingerprint scanner 3 may be stored in a storage medium such as a memory card and the fingerprint images of the memory card may be read by a card reader provided in the scanner interface unit 13.

Here, the fingerprint scanner 3 is a live scanner as shown in conventional art which reads fingerprint images directly from a finger.

The main control unit 11 calculates image quality using fingerprint image data stored in the main memory 12 and rearranges image data according to image quality to conduct processing of selecting image data whose image quality is high.

With respect to a fingerprint image whose image quality is high or feature vector data (fingerprint image data) extracted from the finger image in question, the input/output control unit 14 transmits the preset number of images (e.g. three to five images) to the fingerprint identification device 21 through a communication path 201 in a state where a degree of image quality can be clearly seen.

Then, the input/output control unit 14 transmits and receives a fingerprint image and data such as fingerprint image data by radio or wired communication as the communication path 201 to/from the fingerprint identification device 21. Used here for radio communication is a radio communication network such as a mobile phone or a PHS and for wired communication, a dedicated line, a public line, a LAN (local area network) and an ISDN (integrated service digital network). The Internet via these networks can be also used.

With respect to received fingerprint image data, the fingerprint identification device 21 conducts fingerprint identification processing of a data group having feature vector data of a plurality of fingerprint images of each finger. Hereinafter, feature vector data of a fingerprint image is called as fingerprint image data.

The fingerprint identification device 21 is connected to the fingerprint identification terminal 2, a party to which information of a person registered in a fingerprint data base (DB) which corresponds to an identification result is to be returned, through the communication path 201.

Figure 4:
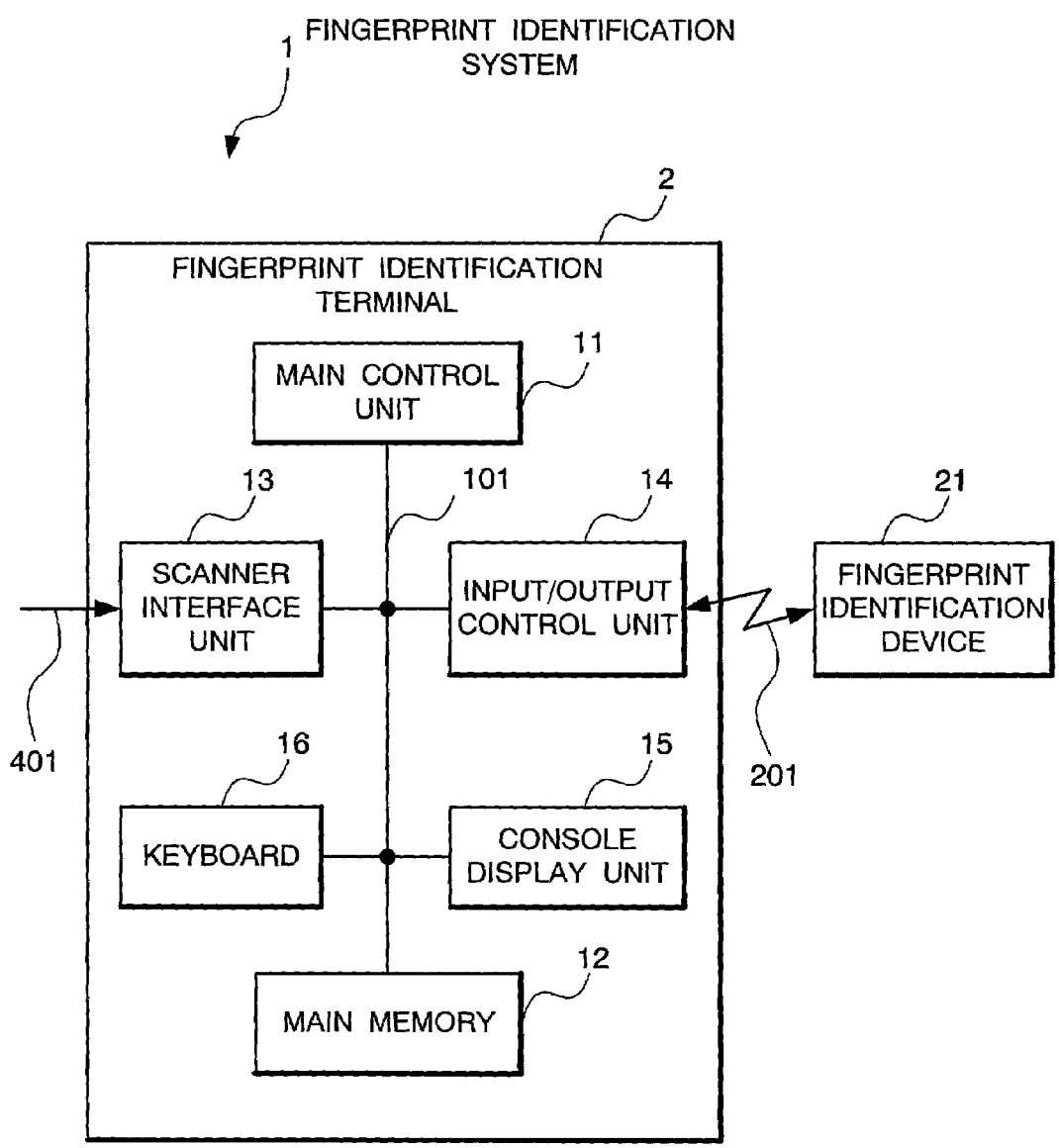
FIG. 4 is a block diagram showing another example of a structure of a fingerprint identification terminal 2 in FIG. 1.

FIG. 4 shows a structure obtained by adding a console display unit 15 and a keyboard 16 to the fingerprint identification terminal 2 illustrated in FIG. 1. With the provision of such human interface parts as the console display unit 15 and the keyboard 16, an identification result is displayed as character information, and an instruction to conduct processing of inquiring of other data base using the identification result information is entered through the keyboard 16.

An operator of the fingerprint identification terminal 2, for example, inputs and changes data (condition data) of each threshold value necessary for identification which will be described in the following through the keyboard 16 and changes a display method of a fingerprint image and an identification result to be displayed on the console display unit 15.

The fingerprint identification terminal 2 can be structured with a so-called personal computer etc.

Next, description will be made of an operation example of the fingerprint identification system according to one embodiment with reference to FIG. 1.

In FIG. 1, the scanner interface unit 13 senses the fingerprint scanner 3 being connected to the fingerprint identification system 1 to start taking in data.

Then, the main control unit 11 senses a fingerprint image being externally applied by either polling processing or interruption processing and preserves, in the main memory 12, the fingerprint image input through the scanner interface unit 13 and fingerprint image data extracted from the fingerprint image with indexes attached thereto.

Here, the main control unit 11, as will be described later, extracts the above-described fingerprint image data as a feature vector from fingerprint images input through the scanner interface unit 13.

In the extraction of fingerprint image data from fingerprint images, obtain a coordinate position of each feature point corresponding to a coordinate of a fingerprint image and a direction vector indicative of a direction of the feature point by arithmetic operation of feature vector data by image processing which will be described in detail later.

Next, after all the processing of preserving externally applied fingerprint images is completed, the main control unit 11 calculates a quality value of each fingerprint image stored in the main memory 12 and preserves the value corresponding to its fingerprint image in the main memory 12.

Then, with the quality value of each fingerprint image corresponding to each kind of fingers (a kind of fingers such as a thumb and a forefinger), the main control unit 11 conducts sorting processing starting with an image whose quality is good to place the images in order at the main memory 12 such that fingerprint images can be specified starting with that of high quality in each kind of finger.

Here, as the quality value of the fingerprint images, such a kind as shown below can be used.

Figure 5:
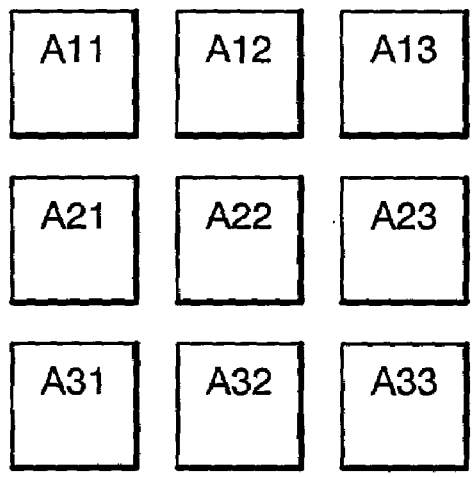
FIG. 5 is a conceptual diagram showing an example of an image for use in explaining image quality.

FIG. 5 is a conceptual diagram showing pixels of a fingerprint image of three rows by three columns as an example of a common fingerprint image.

In the figure, a pixel $A_{ij}$ denotes an element of the fingerprint image designated by i row and j column.

Figure 6:
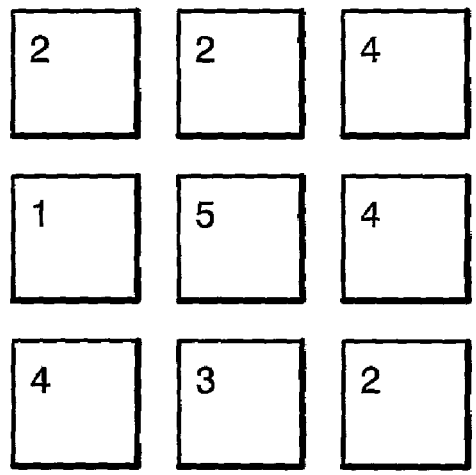
FIG. 6 is a conceptual diagram showing an example of an image for use in explaining image quality, which illustrates a density value of each image.

Description will be here made assuming that a value of a density of the pixel $A_{ij}$ of each fingerprint image shown in FIG. 5 has such a variance as shown in FIG. 6 (the larger the value is, the higher the density value is).

First, among those indicative of a quality value is a mean density.

More specifically, the mean density is a mean value of density values of the respective pixels $A_{ij}$ of the fingerprint image, which, in a case of FIG. 6, is expressed as:

$$(2+2+4+1+5+4+4+3+2)/9=27/9=3.$$

Here, when the value is indivisible, round-up or rounding is made.

Here, a position of each pixel in FIG. 6 corresponds to the pixel $A_{ij}$ of the fingerprint image designated by i row and j column in FIG. 5.

It can be seen that when a target fingerprint image has a stripe pattern, its mean value is larger than that of an image whose background values include only the density value of "0" and that as the density is increased, the mean value becomes larger.

Next, another example indicative of a quality value is a variance, which is a square of a difference from the above-described mean value and which, in the example of FIG. 6, is expressed as follows assuming that ^2 denotes a square:

$$(2-3)^2+(2-3)^2+(4-3)^2+(1-3)^2+(5-3)^2+(4-3)^2+\\(4-3)^2+(3-3)^2+(2-3)^2=1+1+1+4+4+1+1+0+\\1=14.$$

It can be seen that with a large difference (contrast) in variable-density level of pixels constituting a stripe pattern of the fingerprint image, the image is clear to have a large variance.

As other simple quality indexes, a maximum value, a difference between a maximum value and a minimum value are used.

The former maximum value corresponds to the density value of "5", of a pixel $A_{22}$ in FIG. 6.

The latter difference between a maximum value and a minimum value in FIG. 6 corresponds to an absolute value of a difference between the density value of "5" of the pixel $A_{22}$ and the density value of "1" of a pixel $A_{21}$, that is, $|5-1|=4$.

The former enables arithmetic operation to be executed compactly because accumulation and division are unnecessary which are required for calculation of a mean value.

On the other hand, the latter indicates a density difference equivalent to a contrast similarly to variance and as long as it is a fingerprint image, it is expected to have a larger value than a fixed value.

As a further example, because a stripe pattern is cyclic, an intensity of a cyclic component itself can be used as a quality index based on a frequency analysis result obtained by Fourier transformation processing which is a common digital signal processing method.

Next, the main control unit 11 takes out a preset number of fingerprint image data for each kind of finger from the main memory 12 in descending order of quality of fingerprint images and sends the taken out data to the fingerprint identification device 21 through the input/output control unit 14.

In a case, for example, where in the identification using two kinds of fingers, two fingerprint image data is used per finger, fingerprint image data is sent by the input/output control unit 14 to the fingerprint identification device 21 through the communication path 201 in the order of, a first-quality (best quality) image of a first finger, a second-quality (second-best quality) image of the first finger, a first-quality image of a second finger and a second-quality image of the second finger.

Upon input of identification result data through the communication path 201 by the input/output control unit 14, the fingerprint identification terminal 2 makes a request for interruption processing to the main control unit 11 and preserves the input identification result data in the main memory 12 so as to correspond to each kind of finger.

Personal discrimination information discriminated by fingerprint identification and preserved in the main memory 12 including the identification result data can be used for other processing by the main control unit 11 thereafter.

Since the above-described other processing is out of the scope of the present invention, no detailed description will be made thereof.

It is clear that the personal discrimination information can be used, for example, for searching for other information relevant to the person in question.

Among other information are a mug shot, a telephone number and the number of the person's car. Search of various kinds of information is expected.

Figure 2:
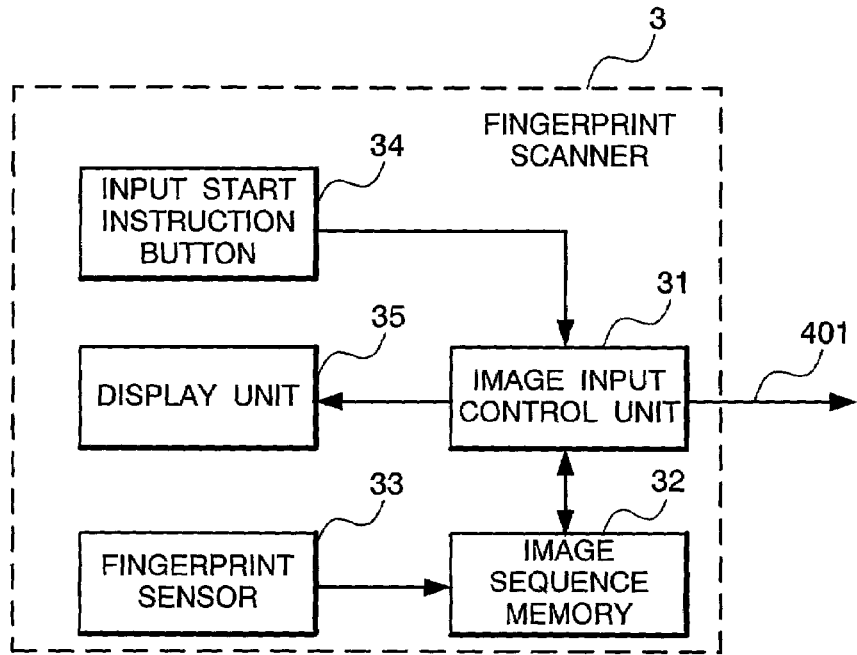
FIG. 2 is a block diagram showing an example of a structure of a fingerprint scanner 3 in FIG. 1.

The fingerprint scanner 3 for taking a plurality of fingerprint images for each finger is structured, for example, as shown in FIG. 2, to which scanner such elements as operate in a manner as described below are connectable.

For example, by an input start instruction button 34, an image input control unit 31 starts operation to control an image sequence memory 32 to receive input of one fingerprint image from a fingerprint sensor 33.

At this time, a user is allowed to confirm fingerprint images stored in the image sequence memory 32 by means of a display unit 35.

In addition, the provision of a path for directly displaying data on the display unit 35 from the fingerprint sensor 33 may enable the user to monitor the stored fingerprint images by means of the display unit 35 in real time.

In any case, input of fingerprint images by the fingerprint scanner 3 is conducted in the same manner as photographing by a so-called digital camera and the input start instruction button is equivalent to a so-called shutter button.

When taking fingerprint images from different kinds of fingers, it is necessary to discriminate a kind of finger and discriminatingly store the images in the image sequence memory 32.

The storage processing can be realized by preparing a plurality of input start instruction buttons corresponding to kinds of fingers or preserving a finger image taken from each finger with information (number and symbol corresponding to each finger) designated by a button or a dial indicative of a finger number added thereto.

Upon storing a plurality of fingerprint images more than a predetermined number (e.g. three to five) for each one finger in the image sequence memory 32, the fingerprint scanner 3 finishes taking fingerprint images to conduct connection processing with the fingerprint identification terminal 2 through the data transfer path 401.

At this time, in order not to have the same fingerprint image, it is desirable that a plurality of fingerprint images of each finger should be taken under different conditions by, for example, placing the fingers at other positions.

As a result of the connection processing, the fingerprint scanner 3 outputs fingerprint images stored in the image sequence memory 32 to the fingerprint identification terminal 2 of FIG. 1.

At this time, the display unit 35 is allowed to notify an operator of whether fingerprint image input operation is properly conducted or not by appropriately obtaining information of fingerprint images from the image input control unit 31.

Figure 3:
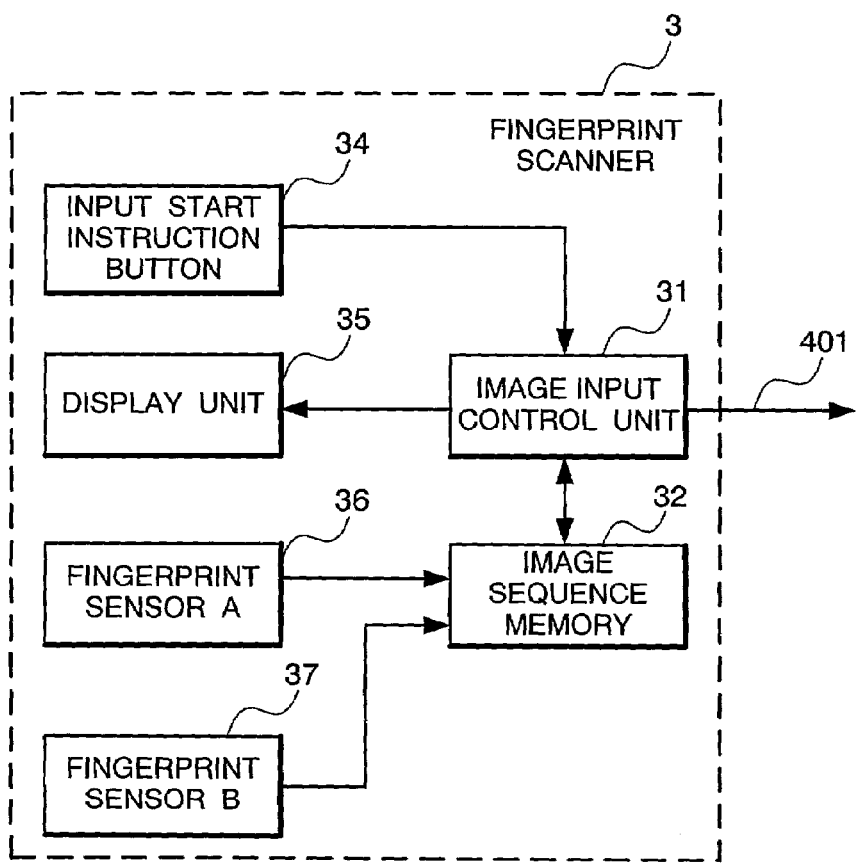
FIG. 3 is a block diagram showing another example of a structure of the fingerprint scanner 3 in FIG. 1.

FIG. 3 is a block diagram showing an example of a structure of the fingerprint scanner 3 having a scanning function of simultaneously scanning fingerprints of two fingers as different kinds of fingers.

In FIG. 3, a fingerprint sensor A36 and a fingerprint sensor B37 are sensors for taking fingerprint images from two simultaneously placed fingers, respectively.

The image sequence memory 32 is designed to store data of fingerprint images in different regions corresponding to the respective fingerprint sensors A36 and B37.

The remaining part of the structure of FIG. 3 is the same as that of the fingerprint scanner shown in FIG. 2 and is the same in operation.

Figure 7:
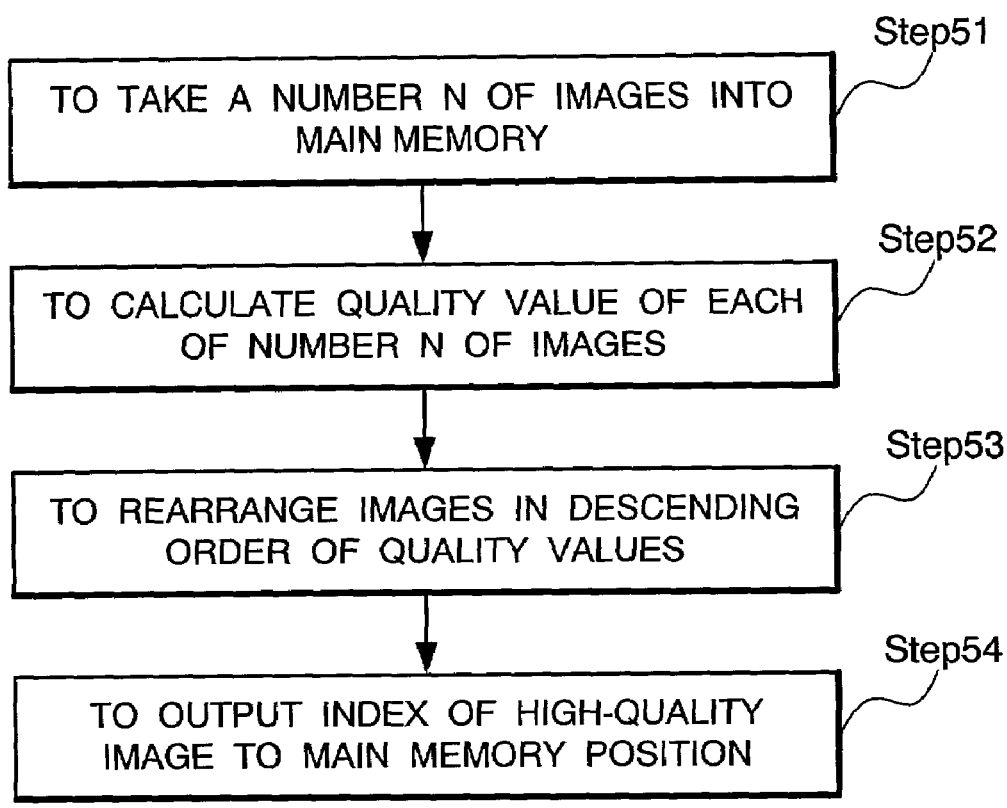
FIG. 7 is a flow chart showing an example of operation of calculating image quality of the fingerprint identification system shown in FIG. 1.

FIG. 7 is a flow chart for use in explaining a part of the processing of calculating image qualities of a plurality of fingerprint images stored in the main memory 12 by the main control unit 11.

First, upon input of a number N of fingerprint images per finger by the fingerprint scanner 3, the main control unit 11 sequentially stores the input fingerprint images into the main memory 12.

Next, the main control unit 11 sequentially calculates a quality value of each of the number N of fingerprint images by each fingerprint image.

Then, upon completion of the calculation of a quality value of each fingerprint image, the main control unit 11 conducts processing of rearranging the fingerprint images (and fingerprint image data) stored in the main memory 12 in descending order of quality values of the calculation results.

At this time, the main control unit 11, for example, relocates an index of each fingerprint image at the main memory 12 to conduct processing of rearranging a plurality of fingerprint images of each finger in descending order of quality values.

Figure 8:
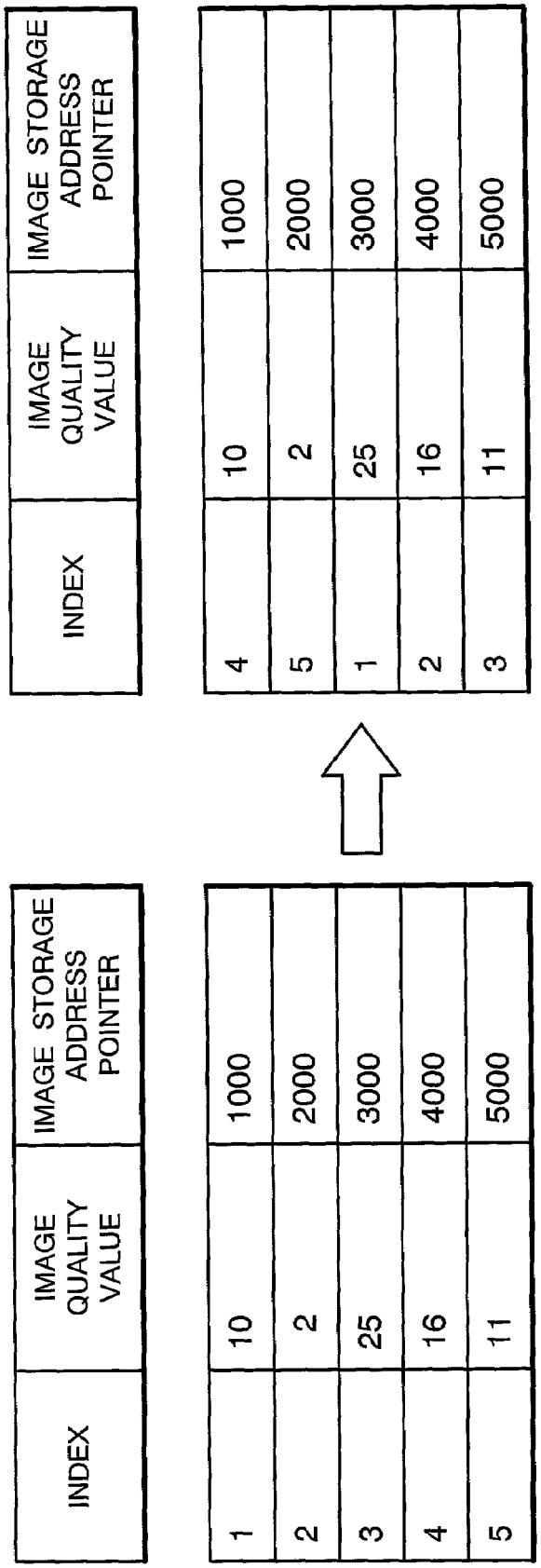
FIG. 8 is a conceptual diagram for use in explaining modification of an index according to image quality in the fingerprint identification system shown in FIG. 1.

The processing can be conducted, for example, using such management tables as shown in FIG. 8.

At a state immediately after taking in five images by the fingerprint scanner to calculate an image quality value of each fingerprint image, images are aligned in order in the management table whose three fields accommodate an index, an image quality value and an image storage address pointer indicative of a storage position of the corresponding fingerprint image.

The management table on the left side of FIG. 8 shows a state immediately after the calculation of an image quality value by the main control unit 11. On the other hand, the management table on the right side shows a state where the main control unit 11 ranks the images according to image quality values to relocate indices of fingerprint images in descending order of image quality values.

By thus changing the state into that shown in the management table on the right side of FIG. 8 to sequentially read the fingerprint image data starting with an image whose index is No. 1, fingerprint image data can be selected in descending order of image qualities of fingerprint images.

The above-described rearrangement enables selection of a predetermined number of fingerprint image data of higher qualities (e.g. when five fingerprint images are obtained, selection of two good quality images) from the main memory 12 and transmission of the selected data to the fingerprint identification device 21.

Next, description will be made of matching processing to be executed with respect to a plurality of fingerprint image data received by the fingerprint identification device 21.

Fingerprint identification processing at the fingerprint identification device 21 has two kinds of functions, one-to-one matching and one-to-N matching.

Here, one-to-one matching represents processing of taking specific fingerprint image data designated from a registration data base where fingerprint image data registered in advance is stored and collating only the registered fingerprint image data and fingerprint image data input through the fingerprint identification terminal 2.

More specifically, one-to-one matching represents processing of determining whether fingerprint image data input through the fingerprint identification terminal 2 coincides with only one fingerprint image data designated among those stored in the registration data base of the fingerprint identification device 21.

On the other hand, one-to-N matching represents processing of conducting matching with all the fingerprint image data in the registration data base or a data group of fingerprint image data coincident with independently designated information.

In other words, one-to-N matching is processing of fingerprint identification for conducting matching with all the number N of fingerprint image data registered at the registration data base.

Among examples of information independently designated in one-to-N matching are age and sex, which information enables fingerprint images to be narrowed down to some extent to eliminate the need of matching with all the fingerprint image data in the data base, thereby reducing a processing time.

In addition, the fingerprint identification device 21 makes matching to find to which degree two fingerprint image data are coincident with each other, fingerprint image data stored in advance in the internal registration data base and fingerprint image data read from the fingerprint scanner 3, and outputs the matching result as an identification score.

Here, concept of an identification score will be outlined in brief.

Figure 9:
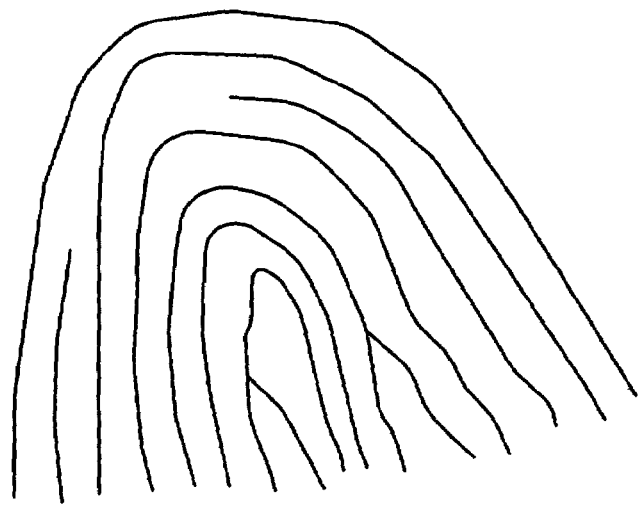
FIG. 9 is a conceptual diagram schematically showing a fingerprint image.
Figure 10:
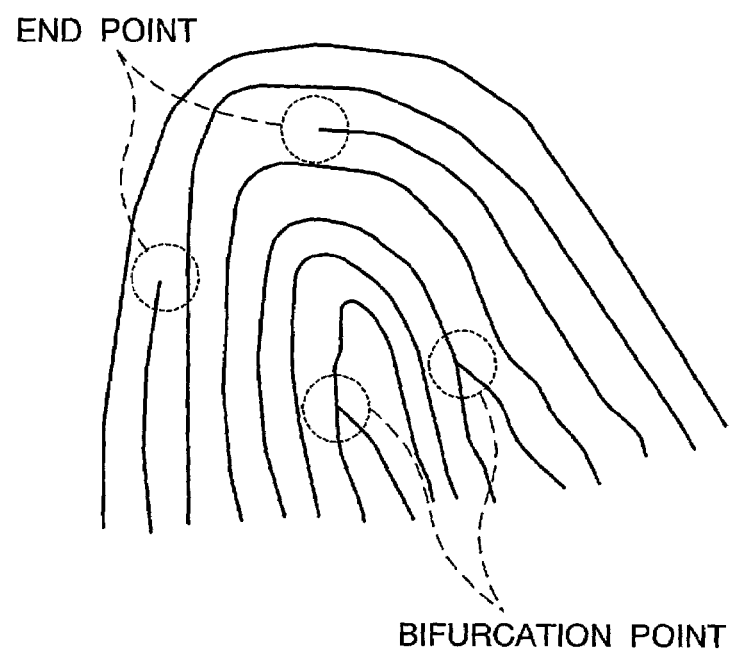
FIG. 10 is a conceptual diagram for use in explaining a feature point in the schematic diagram of a fingerprint image.

FIG. 9 is a schematic diagram of a common fingerprint image. Because it is a common practice to obtain such lines as shown in the figure from ridgy parts of a finger, they are called ridgy lines. Among the ridgy lines, such a bifurcation point and an end point of the ridgy lines as indicated by the circle in FIG. 10 exist, which are called feature points or minutiae.

The above-described fingerprint image data is information indicating, as a feature vector, data of coordinates at which the bifurcation points and end points of the fingerprint images are disposed and a direction vector indicative of a direction to which these bifurcation points and end points face.

Figure 11:
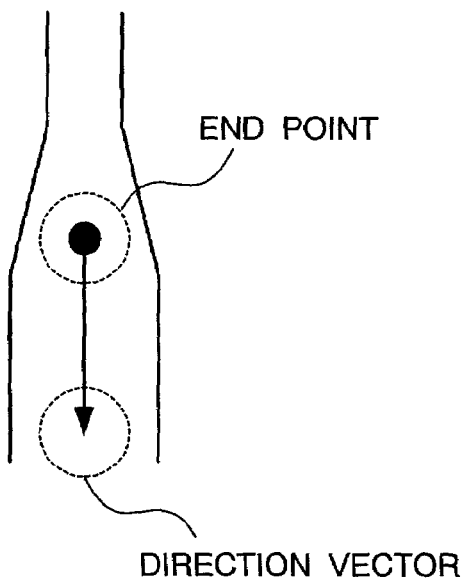
FIG. 11 is a conceptual diagram for use in explaining an endpoint feature point.
Figure 12:
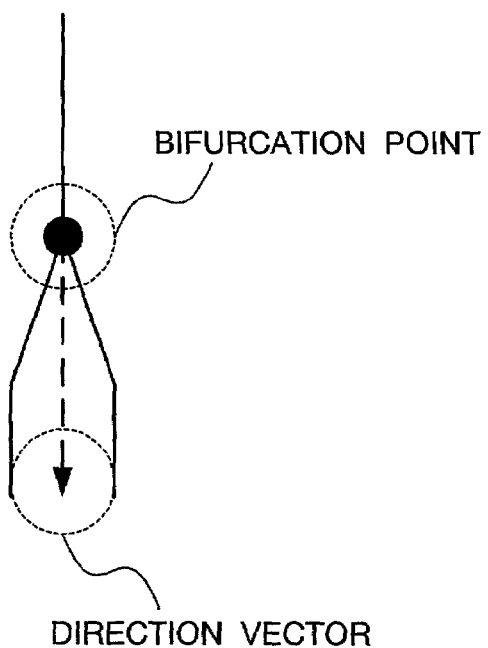
FIG. 12 is a conceptual diagram for use in explaining a bifurcation feature point.

As described above, basic configuration of an end point is shown in FIG. 11 and that of a bifurcation point is shown in FIG. 12.

In automatic fingerprint identification, the fingerprint identification device 21 calculates an identification score in a manner as described below assuming that arrangement (coordinate position) of feature points of these end points and bifurcation points in the fingerprint image and direction vectors of the end point and the bifurcation point are information unique to each fingerprint.

This is the procedure something like looking at constellation with a taken slide superimposed thereon and the fingerprint identification device 21 superposes two fingerprint images to be compared such that the features points are as much overlapped with each other as possible.

Then, when the feature points are substantially overlapped with each other in the two fingerprint image data, the fingerprint image data stored in advance in the registration data base and the fingerprint image data read by the fingerprint scanner 3, to have enough correspondence to consider them to be the same feature point, the fingerprint identification device 21 gives a plus point to each pair of the feature points and when the determination is made that only either one of the fingerprint image data has a feature point, gives a minus point to the feature point.

Assume that in a case, for example, where a fingerprint image read by the fingerprint scanner 3 has an unclear part, if a feature point of fingerprint image data corresponding to the fingerprint image corresponds to the unclear part, the fingerprint identification device 21 gives neither a plus point nor a minus point to the feature point in question.

In addition, it is often conducted, in consideration of a degree of overlapping between feature points of fingerprint image data stored in the registration data base and fingerprint image data obtained from the fingerprint scanner 3 which is caused by a fingerprint image of a finger deformed when pressed on to the fingerprint scanner 3 or the like, to weigh a score according to a distance between the corresponding feature points of these two fingerprint image data.

More specifically, it is statistically known that when coordinates of feature points of the fingerprint image data read from the fingerprint scanner 3 and the fingerprint image data stored in the registration data base are out of place from each other, even if elastic deformation of a finger occurs, the distance between the corresponding feature points overlapped with each other will not become so long as long as they are the corresponding feature points.

On the other hand, when a distance between feature points is long, determination can be made that the feature points basically not corresponding to each other are erroneously made correlated with each other.

Therefore, weighing is conducted to lower a mark of an identification score to be plussed when the distance between feature points is long, and conversely increase the mark of the identification score to be plussed when the distance between the feature points is short.

As described in the foregoing, with fingerprints taken from the same finger, the number of pairs of corresponding feature points is increased to have a larger identification score.

In other words, obtaining a good identification score represents that probability is high that the two fingerprint images are obtained from the same finger.

Although the identification score does not always represent a probability value itself that the two fingerprint image data are identified with each other as a result of fingerprint identification, a large identification score could not be obtained unless fingerprint images are obtained from the same finger in general.

Therefore, when an identification score is larger than a preset threshold value, the determination can be made that they are the same finger.

Threshold value of an identification score can be statistically obtained making the use of the fact that with fingerprint image data of each of a plurality of persons registered in the registration data base in advance, comparison between fingerprint image data obtained from a fingerprint image input through the fingerprint scanner 3 and fingerprint image data registered at the registration data base results in having the FMR and FNMR becoming lower than a target value. Here, the target value is equivalent to an allowable degree of errors and is a specification value of the system, which is designated by an operator such as FMR being 0.01%.

Even with fingerprint images obtained from the same finger, when the quality of the fingerprint image is degraded due to a fingerprint area, deformation or noise at that time, the identification might have a small identification score at the processing of fingerprint identification using fingerprint image data, resulting in disabling fingerprint identification in terms of personal discrimination.

Therefore, the present invention is characterized in being capable of coping with such a case of score reduction by using a plurality of fingerprint images of the same finger.

Next, with reference to the flow chart of FIG. 13, description will be made of an operation example of identification processing using a plurality of fingerprint images at the fingerprint identification device 21 with respect to a case where two fingerprint images are used for every one same finger.

Here, the above-described fingerprint image data obtained from the above-described two fingerprint images will be referred to as a first image and a second image, respectively. Since each fingerprint image is ranked according to its image quality, a first image corresponding to a fingerprint image whose index number is small has higher quality than that of a second image corresponding to a fingerprint image whose index number is large.

In addition, the largest identification score among the N number of identification scores obtained as a result of one-to-N matching will be referred to as a top score.

Moreover, in fingerprint matching between fingerprint image data read from the fingerprint scanner 3 and fingerprint image data stored in the internal registration data base of the fingerprint identification device 21, in order to determine whether these fingerprint image data are identified with each other, it is necessary to check whether an identification score which determines an identification result is larger than a certain set value or not.

The above-described set value is referred to as a threshold value. Here, two threshold values are set, of which one having a higher value will be refereed to as a high-order threshold value and the other having a lower value will be referred to as a low-order threshold value. These high-order threshold value and low-order threshold value are assumed to be statistically set based on a test using fingerprint images taken from a plurality of persons such that identification of fingerprints can be ultimately determined at probability with, for example, 0.01% of FMR.

Assume here that for enabling a fingerprint image of lower quality to be identified, the high-order threshold value is set to be a little lower than a threshold value in a conventional case where one image is used per one finger in order to lower an FNMR.

It is, however, apparent that lowering a threshold value will increase probability of identification errors as FMR.

The present invention is characterized in reducing probability of an identification error as FMR in the processing of fingerprint identification by using a plurality of fingerprint images for the same finger.

Figure 13:
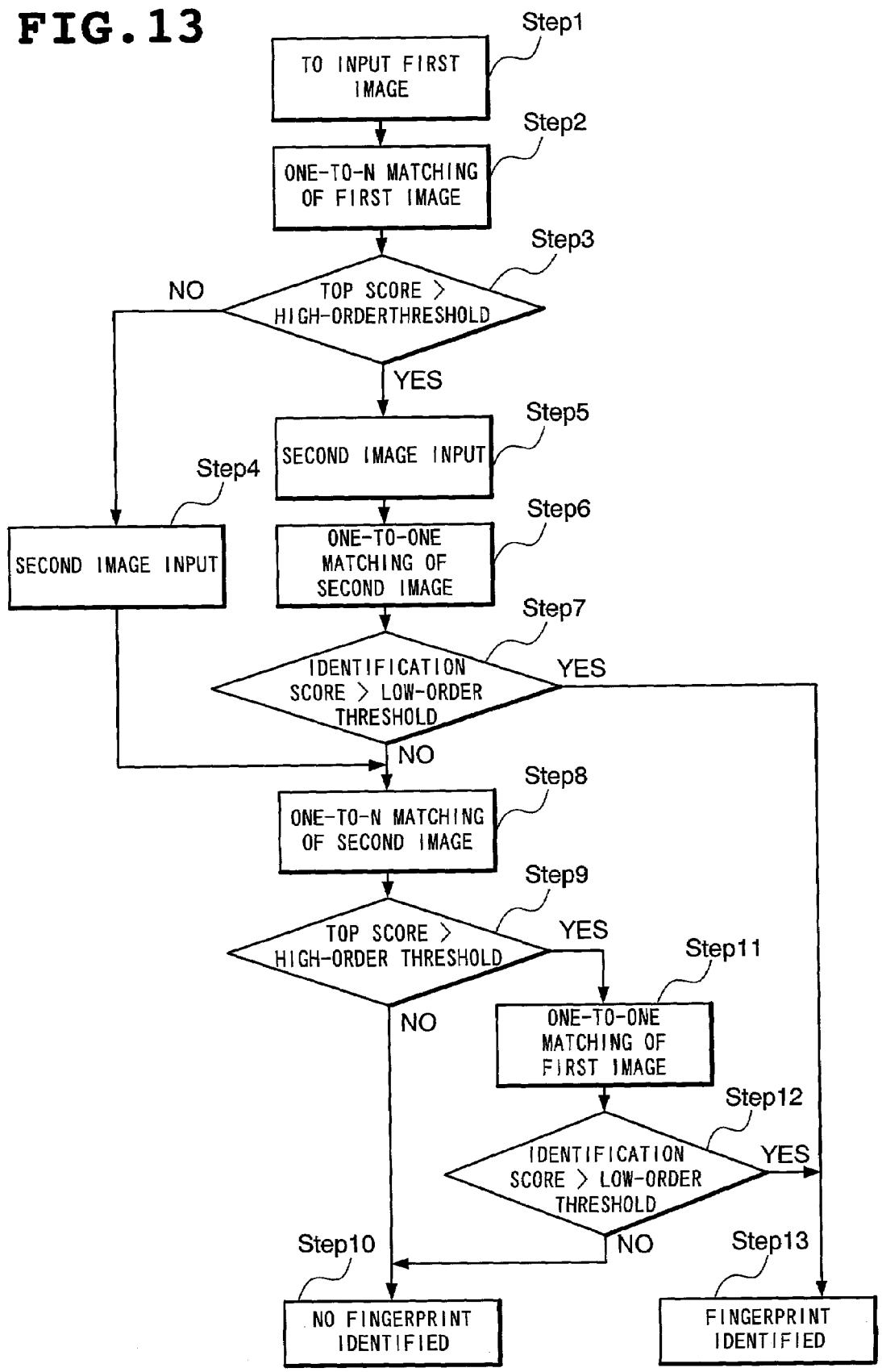
FIG. 13 is a flow chart for use in explaining an example of operation of identification processing using a plurality of images at the fingerprint identification system shown in FIG. 1.

At Step 1 of the flow chart in FIG. 13, the fingerprint identification device 21 receives input of the first image from the fingerprint identification terminal 2.

Then, at Step 2, the fingerprint identification device 21 conducts one-to-N matching of the first image with all the fingerprint image data (number N of fingerprint image data) stored in the internal registration data base.

Next, when at Step 3, a top score of the number N of identification scores obtained by the one-to-N matching at Step 2 exceeds a high-order threshold value, the fingerprint identification device 21 advances the processing to Step 5.

Then, at Step 5, the fingerprint identification device 21 reads the second image from the fingerprint identification terminal 2 to advance the processing to Step 6.

Next, at Step 6, selecting one-to-one matching of the read second image only with fingerprint image data of a person corresponding to the first image which has the top identification score obtained by the matching result at Step 3, the fingerprint identification device 21 conducts one-to-one matching.

Here, because of one-to-one matching, a time of one-to-one matching processing at Step 6 is much shorter than a processing time required for one-to-N matching.

Next, at Step 7, the fingerprint identification device 21 determines whether the identification score obtained as a result of the matching is larger than the low-order threshold value or not.

Here, since the image quality of the second image is lower than that of the first image already used in matching, it is highly probable that an identification score will be smaller than that of the first image.

Therefore, at Step 7, the fingerprint identification device 21 determines an matching result using a low-order threshold value set for an identification score between the second image and fingerprint image data selected in the first image from the registration data base. Here, the low-order threshold value is set to be smaller than the high-order threshold value.

More specifically, the fingerprint identification device 21 advances the processing to Step 13 when the identification score obtained as a result of comparison between the second image and the fingerprint image data stored in the registration data base is larger than the low-order threshold value, while when the identification score obtained as a result of the comparison between the second image and the fingerprint image data stored in the registration data base is not larger than the low-order threshold value, advances the processing to Step 8.

Then, at Step 13, upon determination that the identification scores obtained as a result of the comparison of the first image and the second image with the preset fingerprint image are larger than the high-order threshold value and the low-order threshold value, respectively, the fingerprint identification device 21 makes the determination that personal discrimination is made by the first image and the second image of the plurality of fingerprint image data input through the fingerprint scanner 3.

Also at Step 3, the fingerprint identification device 21 advances the processing to Step 4 when the top score of the first image fails to reach the high-order threshold value.

Next, at Step 4, the fingerprint identification device 21 selects fingerprint image data as a target of matching whose matching processing should be conducted next, that is, reads the second image from the fingerprint identification terminal 2 to advance the processing to Step 8.

Then, at Step 8, the fingerprint identification device 21 selects one-to-N matching for conducting matching of the read second image with all the fingerprint image data in the registration data base and conducts the one-to-N matching.

Here, since the second image has image quality inferior to that of the fingerprint image of the first image, a large identification score is ordinarily less likely to be marked than that of the matching of the first image.

The processing, however, should be conducted taking into consideration that the second image might in some cases have a larger identification score than that of the first image because of deformation or nature of noise.

Next, at Step 9, the fingerprint identification device 21 advances the processing to Step 11 when the top score of the number N of identification scores is larger than the high-order threshold value as a result of the matching between the second image and the fingerprint image data stored in the registration data base, while when the top score of the second image fails to become larger than the high-order threshold value, advances the processing to Step 10.

Then, at Step 11, the fingerprint identification device 21 selects one-to-one matching between fingerprint image data which has the top score in the matching with the second image and which is recorded in the registration data base and the first image selected as a subsequent target of matching to conduct the one-to-one matching.

At this time, when a result of one-to-N matching of the first image already executed at Step 2 exists, the matching result may be referred to and used as a matching result without newly conducting one-to-one matching.

Next, at Step 12, when the one-to-one identification score of the first image exceeds the low-order threshold, the fingerprint identification device 21 advances the processing to Step 13 to determine that personal discrimination is made.

On the other hand, the fingerprint identification device 21 advances the processing to Step 10 when no score exceeds the low-order threshold value.

Then, at Step 10, the fingerprint identification device 21 determines that no fingerprint image data coincident with the first image and the second image stored in the registration data base.

Also at Step 7, when the identification score obtained by the one-to-one matching of the second image fails to reach the low-order threshold value, the fingerprint identification device 21 conducts the matching processing with the conditions of the first image and the second image changed at Step 8 and the following steps.

This arrangement produces an effect of increasing possibility of successful matching when a difference in quality between the first image and the second image is small because quality evaluation itself which determines the first image and the second image does not always have correlation with the amount of identification score.

Figure 14:
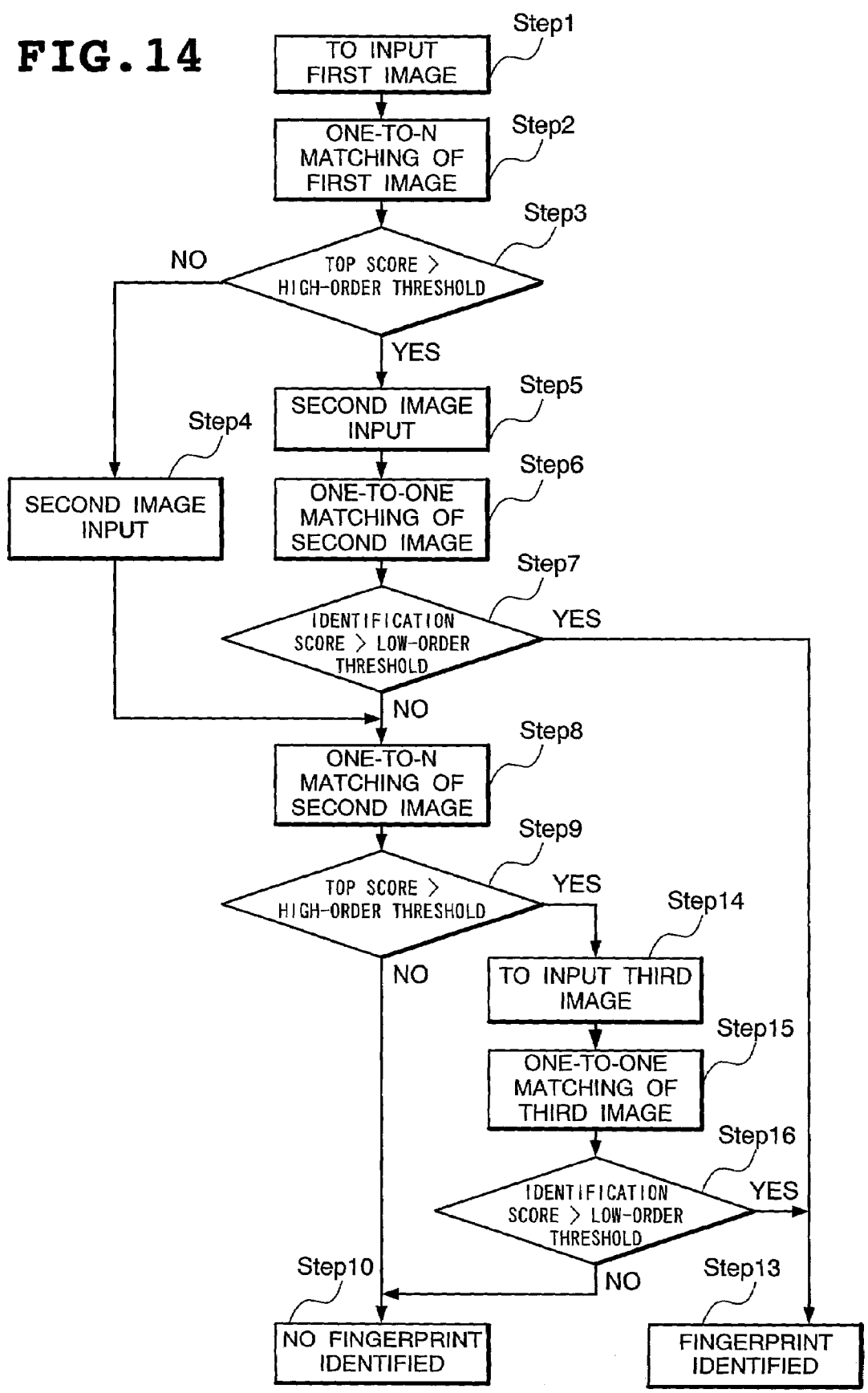
FIG. 14 is a flow chart for use in explaining an example of operation of identification processing using a plurality of images at the fingerprint identification system shown in FIG. 1.

The flow chart of FIG. 14 shows an embodiment where up to three images can be used for each one of the same finger.

More specifically, the flow chart of FIG. 14 differs in the flow chart of FIG. 13 in that Steps 11 and 12 are changed to 14, 15 and 16.

At Step 14, the fingerprint identification device 21 receives input of not the first image but a third image (fingerprint image having the third-highest quality) from the fingerprint identification terminal 2.

Then, at Step 15, the fingerprint identification device 21 conducts one-to-one matching between fingerprint image data having the top score in the matching with the second image and the third image.

Next, at Step 16, the fingerprint identification device 21 makes the determination of final identification result based on the determination of an identification score obtained from the third image with respect to the low-order threshold value.

In the flow chart shown in FIG. 13, in a case where the first image is excellent in image quality, when it has a problem in matching with fingerprint image data registered at the registration data base, for example, when a region where the first image and the fingerprint image data registered at the registration data base overlap with each other is small or when deformation of a fingerprint image is large due to elasticity, no matching is possible.

Then, as shown in the flow chart of FIG. 14, a chance of matching can be increased by adding one more fingerprint image.

Figure 15:
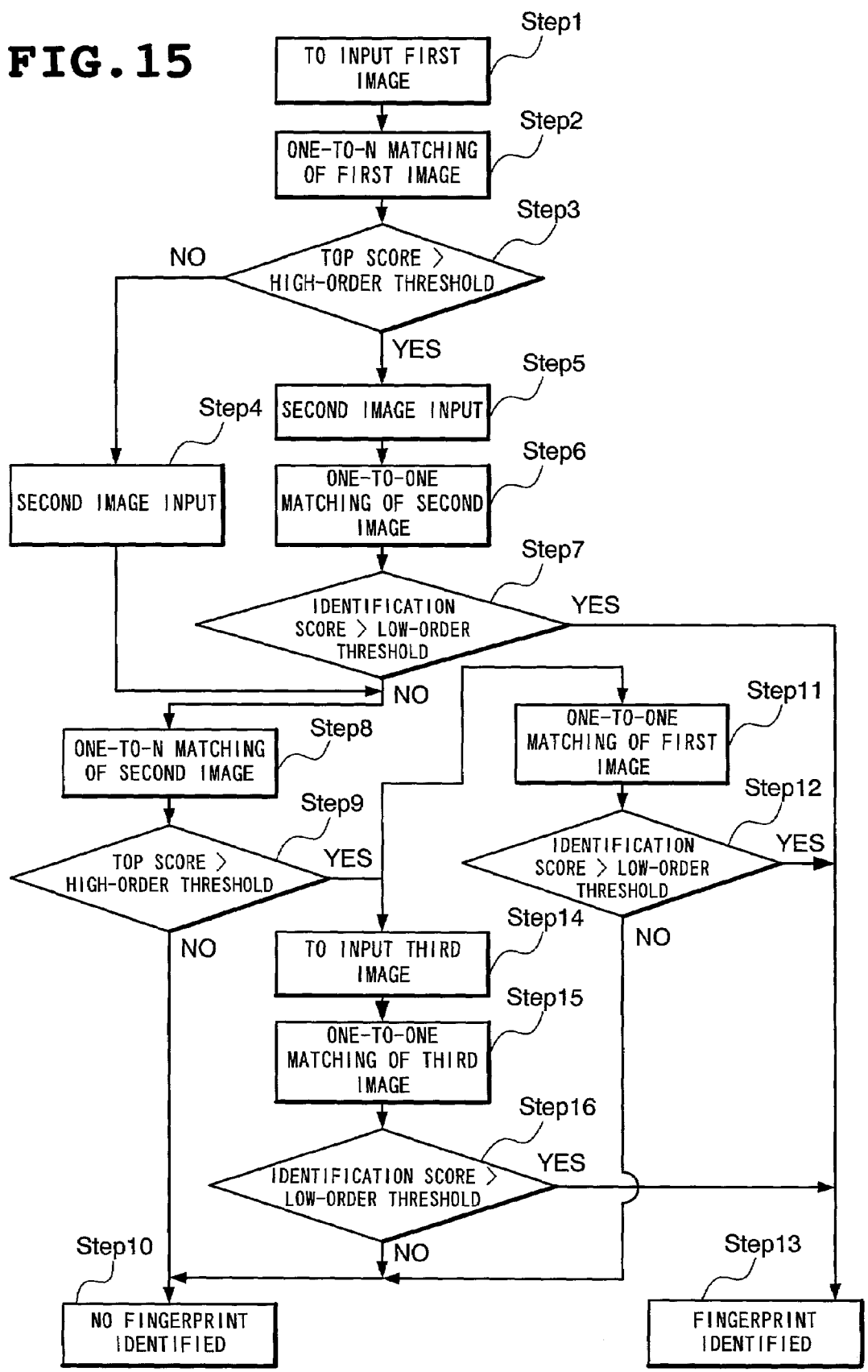
FIG. 15 is a flow chart for use in explaining an example of operation of identification processing using a plurality of images at the fingerprint identification system shown in FIG. 1.

The flow chart of FIG. 15 have the processing contents including those of the flow charts of FIGS. 13 and 14.

More specifically, when an identification result obtained by the one-to-N matching of the second image at Step 9 has a score exceeding the high-order threshold value, Steps 11 and 12 and Steps 14, 15 and 16 operate in parallel to each other and when one-to-one matching is established at either Step 12 or Step 16, personal discrimination is assumed to be made.

Thus, the present invention is characterized in that even with a fingerprint image whose quality is low, fingerprint identification between fingerprint image data extracted from the fingerprint image and fingerprint image data stored (registered) at the registration data base is enabled by adding verification processing by one-to-one matching using a less stringent threshold value to one-to-N matching results of a plurality of images.

Although one embodiment of the present invention has been described in detail with reference to the drawings in the foregoing, specific structure is not limited to those of the present embodiment and the present invention includes any design change and the like within the scope of the present invention.

Next, description will be made of a specific embodiment as the second embodiment of the present invention whose basic structure is the same as that of FIG. 1 for conducting identification determination of fingerprints using a plurality of fingerprint images for one finger at the fingerprint identification device 21 with reference to FIG. 16.

At Step 21, the fingerprint identification device 21 receives input of the first image from the fingerprint identification terminal 2.

Next, at Step 22, the fingerprint identification device 21 executes one-to-N matching for comparing the first image read by the fingerprint scanner 3 and all the fingerprint image data stored in the internal registration data base.

Then, at Step 23, the fingerprint identification device 21 creates a list in which identification results obtained at Step 22 are sorted in descending order of identification scores, that is, fingerprint image data is rearranged in descending order of identification scores. The identification score is stored in a storage unit of the fingerprint identification device 21 in correspondence with fingerprint image data.

The fingerprint identification device 21 executes the same processing as the above-described processing of Steps 21, 22 and 23 conducted with the first image also with respect to the second image at Steps 24, 25 and 26.

Next, at Step 27, the fingerprint identification device 21 refers to the list of results of two fingerprint image data of the first and the second images at Steps 23 and 26, respectively, to calculate a fusion score between fingerprint image data having identification scores larger than low-order threshold values TL corresponding to these fingerprint image data on the basis of a fingerprint registered at the registration data base.

Here, a fusion score represents one score value newly calculated based on two identification scores obtained at Steps 23 and 26, which includes, as a simple example, a mean score of the two identification scores.

In general, the fusion score is calculated in a form of two-input one-output function.

In a case of a mean score, with a function denoted as f and two inputs as x (identification score in the first image) and y (identification score in the second image), a fusion score as a mean value between the identification score x and the identification score y can be calculated according to the following expression:

$$f(x,y)=(x+y)/2$$

Then, at Step 28, the fingerprint identification device 21 determines whether the above-described fusion score agrees with preset conditions or not and when the score satisfies the identification conditions of a fusion score, advances the processing to Step 29 and when it fails to satisfy the conditions, advances the processing to Step 30.

As a result, the fingerprint identification device 21 determines at Step 29 that as a result of the matching, the fingerprint image data applied from the fingerprint identification terminal 2 is identified.

On the other hand, at Step 30, the fingerprint identification device 21 determines that the fingerprint image data applied from the fingerprint identification terminal 2 fails to be identified as a result of matching.

Here, one embodiment of a method of calculating a fusion score at Step 27 will be described with reference to FIG. 17.

Figure 17:
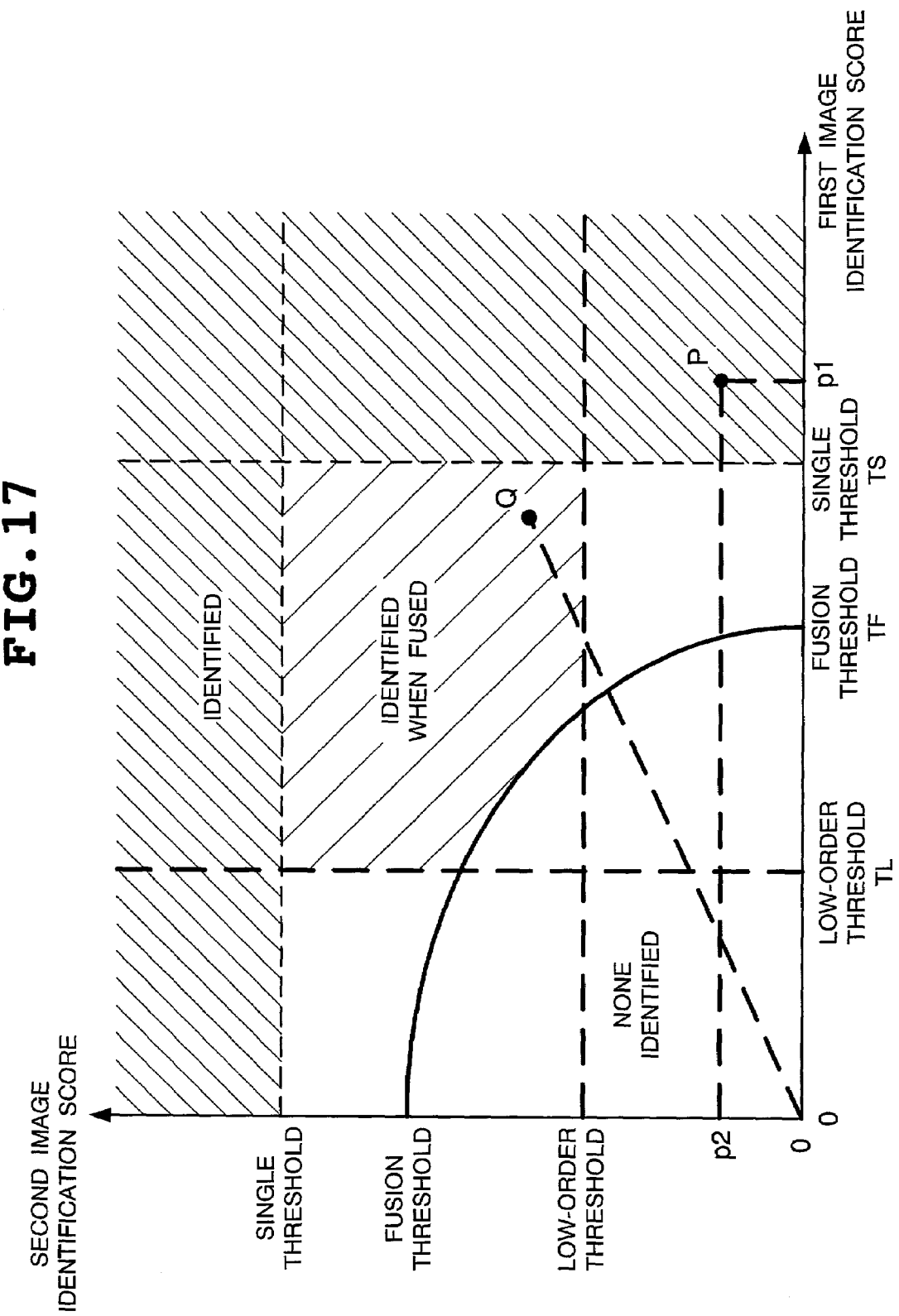
FIG. 17 is a conceptual diagram for use in explaining fusion processing of scores using a plurality of images.

FIG. 17 is a graph showing a range of determination using a fusion score. An abscissa represents an identification score of the first image and an ordinate represents an identification score of the second image.

In conventional fingerprint identification, among results of matching between fingerprint image data applied from the fingerprint scanner 3 and fingerprint image data recorded in the registration data base, only an identification score larger than a single threshold value TS in FIG. 17 is determined to have its fingerprint identified.

Here, a single threshold value represents a value of an identification score statically obtained from a test using fingerprint images of a plurality of persons, with which FMR becomes not more than a target value based on identification determination results.

A region hatched with fine slanting lines in FIG. 17 shows that in either the first image or the second image, an identification score obtained as a result of comparison with fingerprint image data registered at the registration data base was larger than the single threshold value TS.

For example, at a point P in FIG. 17, although an identification score p1 of the first image is larger than the single threshold value TS and an identification score p2 of the second image is smaller than the single threshold value TS, because the identification score p1 is large enough, the fingerprint identification device 21 determines that the fingerprint image data input from the fingerprint identification terminal 2 and some of the fingerprint image data stored in the registration data base coincide with each other. Here, a region where the scores exceed the single threshold values (identified) is indicated as a fine hatched region.

As is already described, since an identification score larger than the single threshold value TS is a phenomenon that occurs only when fingerprints coincide with each other statistically, within a range of the above-described hatched region, the fingerprint can be determined to be coincident.

Assume, for example, that calculation of the following expression is made as a function of a fusion score, in which ^2 denotes a square:

$$f(x,y)=x^2+y^2$$

It can be seen that calculated by the expression is a square of a distance from an origin on a two-dimensional plane of the identification score x and the identification score y to the point (x, y).

In this case, since the fusion score is defined as a distance from the origin to the point (x, y), it has a value obtained by taking a square root of f(x, y).

In FIG. 17, notice a point Q. Although the identification scores are considerably large, neither in the first image nor in the second image, an identification score exceeds the single threshold value TS as a result of matching with the fingerprint image data stored in the registration data base.

However, in both of the first image and the second image, identification scores obtained as a result of matching with the fingerprint image data recorded in the registration data base stably exceed the low-order threshold value TL.

Then, as a result of the calculation of a fusion score equivalent to a distance OQ from the origin of the graph of the fusion score, when at a region exceeding the low-order threshold value TL, the score is mapped outside a region of a circle with a fusion threshold value TF as a radius (roughly hatched region: identification is made when fused) as illustrated in FIG. 17, the fingerprint can be considered to be identified.

In other words, in FIG. 17, a boundary defining a part also including the roughly hatched region is a quarter circle with the low-order threshold value and the fusion threshold value as a radius.

More specifically, a fusion score (obtained from the identification score x and the identification score y) is nothing more than a certain score value determined for each point on the two-dimensional plane made up of two identification scores of the first image and the second image as illustrated in FIG. 17 and it is apparent that the score can be handled in a table format.

Here, the fusion threshold value TF is obtained by fusion calculation in which the low-order threshold value TL and the identification score x and the identification score y are selected such that identification results statistically have a value having practical accuracy (e.g. identification is properly made at probability with 0.01% of FMR) based on the results of tests using a plurality of persons, thereby calculating the above-described fusion threshold value from the identification score x and the identification score y.

Figure 16:
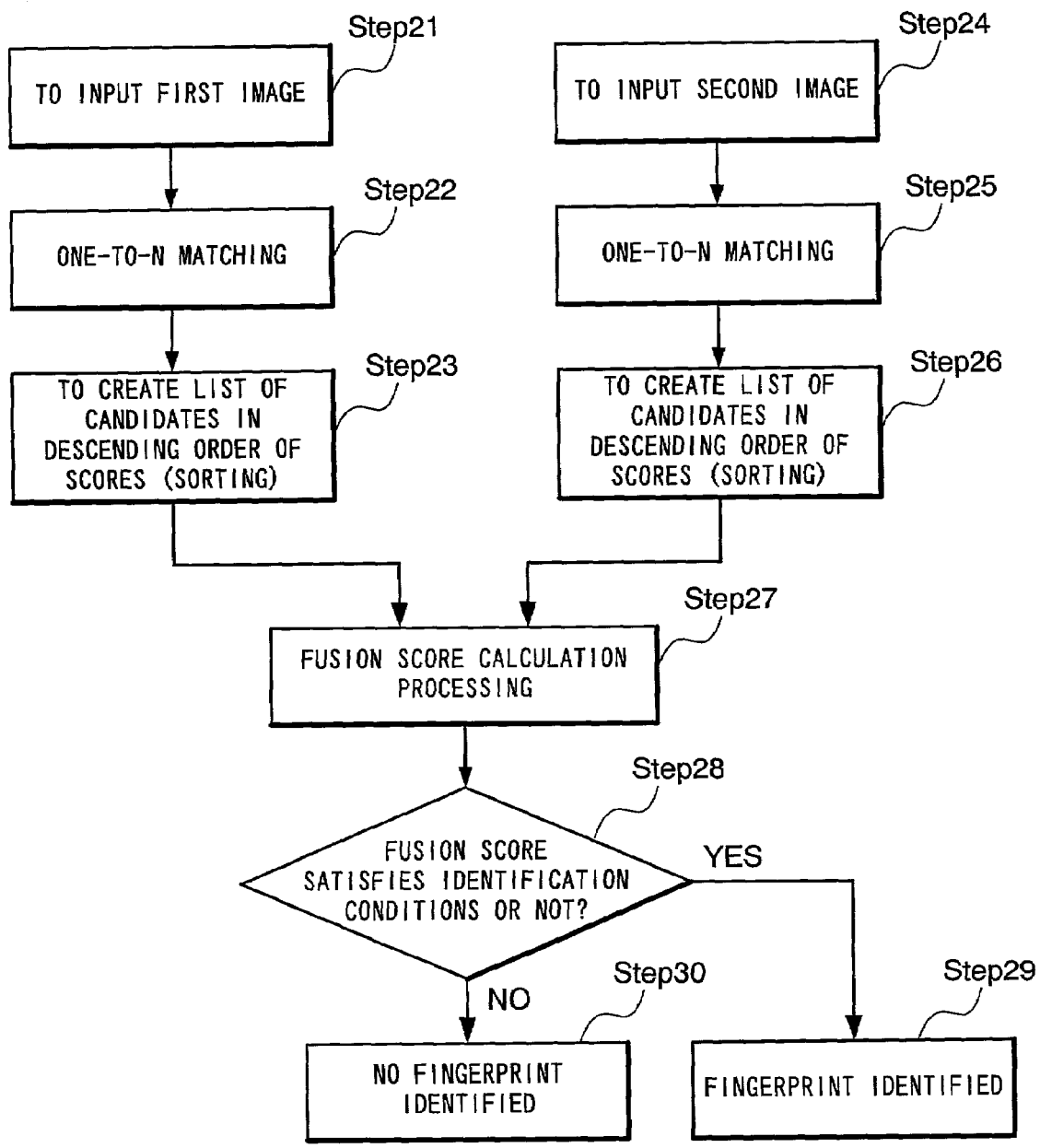
FIG. 16 is a flow chart for use in explaining an example of operation of identification processing using a plurality of images at the fingerprint identification system shown in FIG. 1.

In the flow chart of FIG. 16, final determination of identification is made by once obtaining such a fusion score and comparing the obtained fusion score with the fusion threshold value TF.

Next, as a third embodiment of the present invention, whose basic structure is the same as that of FIG. 1, description will be made of an embodiment in which identification processing of fingerprint images using a plurality of fingerprint image data at the fingerprint identification device 21 is executed using a plurality of image data of a plurality of different kinds of fingers.

In a fingerprint identification device, in general, as a registration data base has a larger size, a plurality of identification candidates exceeding a threshold value might appear even from different fingers.

This derives from statistical nature that the larger a population is, the higher probability becomes that similar fingerprint image data is included internally.

As a result, in fingerprint identification at a large-scale registration data base, it is in some cases impossible to narrow candidates down to one in the matching using one kind of finger.

Therefore, conducting fingerprint identification processing using other fingers of the same person, that is, using a plurality kinds of fingers, enables identification precision to be ensured.

Because candidates are narrowed down by a first finger, a target range of matching with a second finger can be extremely narrowed.

Therefore, as described above, the third embodiment can be considered to be the expansion of the first and the second embodiments to fingerprint identification conducted with respect to fingerprint image data in a large-scale fingerprint registration data base using a plurality of different kinds of fingers.

Figure 18:
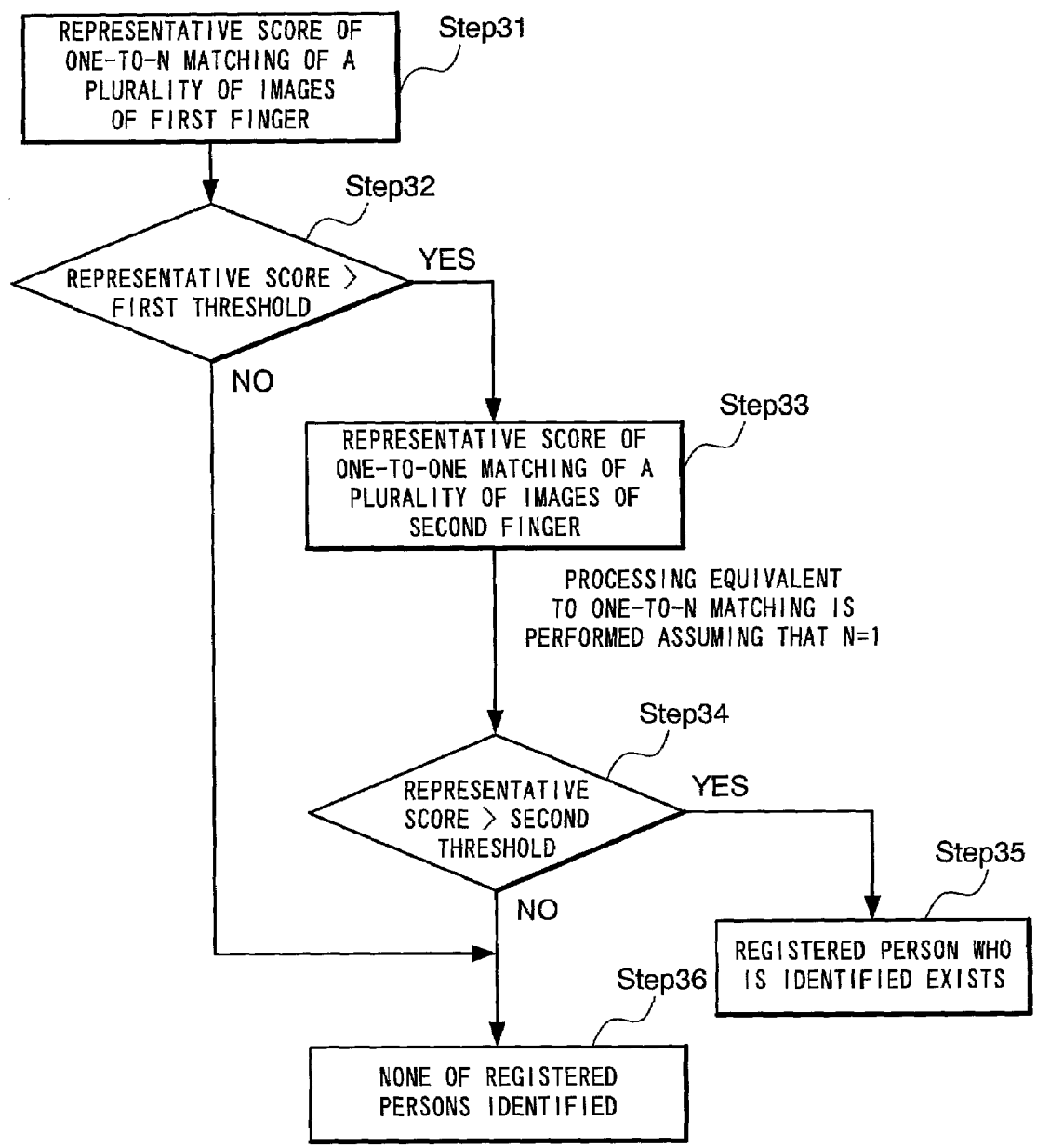
FIG. 18 is a flow chart for use in explaining an example of operation of identification processing using a plurality of fingers at the fingerprint identification system shown in FIG. 1.

FIG. 18 is a flow chart for use in explaining an example of operation of conducting identification using a plurality of fingerprint image data of two kinds of fingers (e.g. first finger is a thumb and second finger is a forefinger).

In FIG. 18, Step 31 is a step for obtaining an identification score by the fingerprint identification device 21 using a plurality of images of the first finger.

Here, when the flow charts of FIGS. 13 and 14 are applied to Step 31, in a case of FIG. 13, one representative score of the first finger should be obtained from respective scores of identification between two fingerprint image data of the first image and the second image and the fingerprint image data stored in the registration data base.

Here, a representative score is so named for determining, from a plurality of identification scores obtained from a plurality of fingerprint image data of each one finger, fingerprint image data of an identification score as one representative of the identification scores of the finger.

In a case, for example, where identification is made with respect to the first finger in the flow chart of FIG. 13, since identification scores of the first finger for use in the identification are two for each fingerprint, one in the first image and the other in the second image, fingerprint image data of an identification score representing an identification result of the first finger should be determined from among them.

Here, used as a representative score is a larger value of the two identification scores in the first image and the second image or a mean value.

A representative score in a case where fingerprint identification using a plurality of fingerprint image data ends with no identification at Step 10 of FIG. 13 is assumed to be equivalent to "0".

Also in the case of the flow chart shown in FIG. 14, the same calculation as that of the above-described steps in FIG. 13 should be made of a representative score from two or three identification scores of the first, second and third images used in the course of determining that fingerprint is identified at Step 13 in the comparison with the fingerprint image data in the registration data base.

In a case where the flow chart of FIG. 15 is used at Step 31, since the flow chart of FIG. 15 includes both the flow charts of FIGS. 13 and 14, a representative score should be calculated in the same manner as that of the above-described steps in FIG. 13 from identification scores of two or three fingerprint image data used in the course of identification determination.

In a case where FIG. 16 is used at Step 31, it is possible, for example, to calculate an equivalence to a distance between a point plotted in the graph by two scores and the origin as a fusion score in FIG. 17 and consider the score as a representative score.

More specifically, calculate a square root of a square-sum of an identification score obtained as a result of matching with two fingerprint image data.

At Step 32 of FIG. 18, the fingerprint identification device 21 narrows down candidates as a target of matching depending whether a representative score of the first finger obtained at Step 31 exceeds a threshold value for the fingerprint image data of the first finger (first finger threshold value) or not.

Step 33 is to conduct one-to-one matching of the second finger with a finger kind (a kind of finger) as a target of matching candidates obtained at Step 32 and a method of calculating a representative score for a plurality of fingerprint image data is completely the same as that of Step 31.

At Step 34, when the second finger also has a representative score exceeding a threshold value (second finger threshold value) for the fingerprint image data of the second finger, the fingerprint identification device 21 considers that coincidence and identification with a person registered at the data base is made at Step 35. otherwise it has a result that no relevant person exists at Step 36.

Here, the first finger threshold value and the second finger threshold value are obtained in the same manner as that of other threshold values by statistically calculating a value enabling identification with certain probability, for example, with 0.01% of FMR, based on fingerprint images sampled from a plurality of persons.

This system, using fingerprints of two different fingers in combination, produces an effect of reducing probability of erroneous identification.

Figure 19:
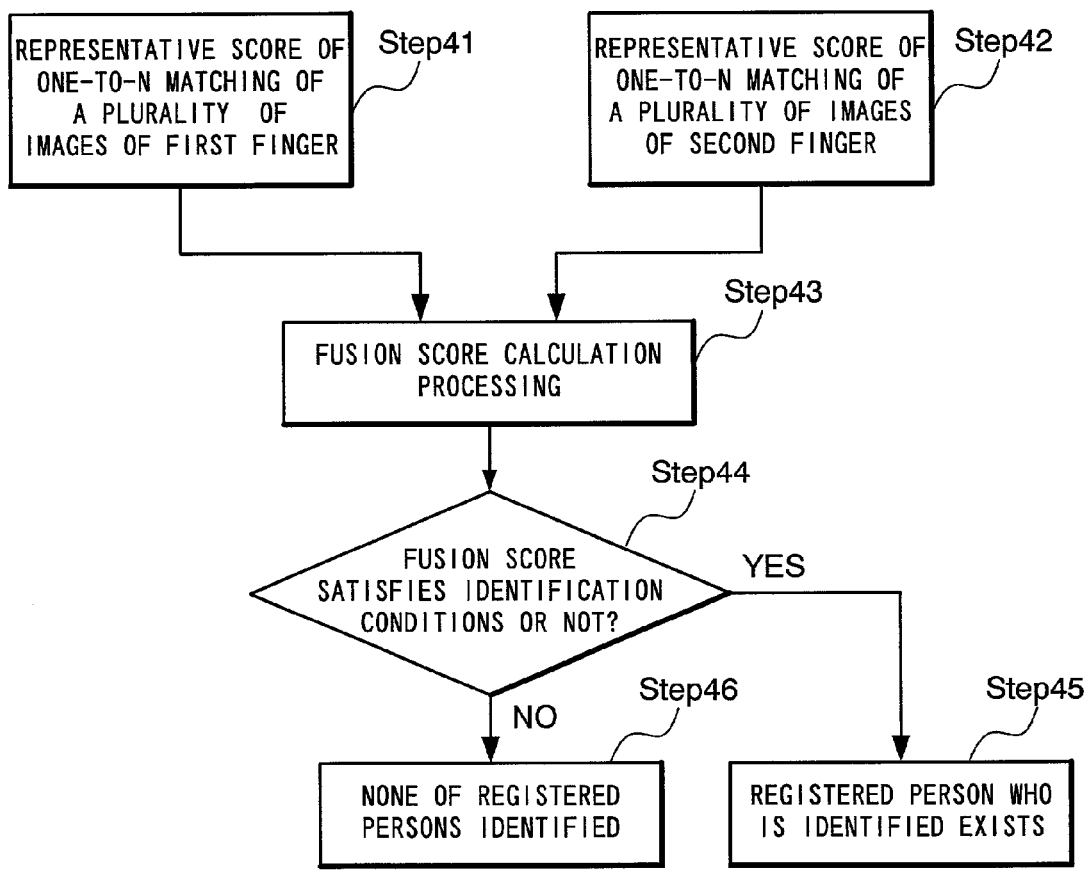
FIG. 19 is a flow chart for use in explaining an example of operation of identification processing using a plurality of fingers at the fingerprint identification system shown in FIG. 1.

FIG. 19 is a flow chart for use in explaining other embodiment of conducting total identification using representative scores of two kinds of fingers as well as FIG. 18.

In FIG. 19, Steps 41 and 42 are steps for calculating a representative score of each of the first and the second fingers obtained in one-to-N matching. Step 43 is a step for further calculating a fusion score of the two representative scores, which is the same processing at that of Step 27 in FIG. 16 and can be realized, for example, using the method described with reference to FIG. 17.

At Step 44, based on whether an obtained fusion score exceeds a threshold value or not, the fingerprint identification device 21 can obtain a result of coincidence and identification with a person registered in the data base (one whose fingerprint image data is registered at the registration data base).

Although the foregoing description has been made using two kinds of fingers, the same method is applicable also to a case where three or more kinds of fingers are used.

In a case of, for example, three or more kinds of fingers, when conforming to the manner shown in FIG. 18, if an identification score of the second finger is smaller than a threshold value, identification is conducted using an identification score of the third finger and when conforming to FIG. 19, determination is made using a fusion score obtained by fusing identification scores of three kinds of fingers.

The present invention is characterized in expanding a range of application to a case where a fingerprint image has low quality by taking a plurality of fingerprint images with respect to each of the first, second, and third finger, and using a representative score of the fingerprint image data extracted from these images.

Here, a threshold value for an identification score of fingerprint image data of the first finger, a threshold value for an identification score of fingerprint image data of the second finger and a threshold value for an identification score of fingerprint image data of the third finger are obtained from fingerprint images sampled from a plurality of persons by statistically calculating a value enabling identification with predetermined probability, for example, with 0.01% of FMR as is done for calculation of the other threshold values.

As can be seen from the example of three kinds of fingers, even when a representative score of one of the fingers is extremely small, as long as representative scores of the other two fingers are large enough, they can be considered to be identified, and accuracy of fingerprint identification can be improved by checking, with respect to a target person who is conventionally counted out from search because fingerprint images of two fingers are not clear enough to determine coincidence, whether at least two of three kinds of fingers have large scores or not.

In addition, a program for realizing all or any or a combination of the steps in FIGS. 7, 13, 14, 15, 16, 18 and 19 may be recorded in a computer-readable recording medium and the program recorded in this recording medium may be read into a computer system for execution, thereby conducting graphical processing. "Computer system" here includes hardware such as an OS and peripheral equipment. "Computer-readable recording medium" represents a storage device such as portable media including a floppy disc, an optical magnetic disc, a ROM and a CD-ROM, and a hard disc contained in a computer system.

Moreover, "computer-readable recording medium" includes one dynamically holding a program for a short period of time such as a communication line for use in a case of transmission of a program through a network such as Internet and a communication circuit such as a telephone line and one temporarily holding a program for a fixed period of time such as a volatile memory inside a computer system which serves as a server or a client in this case. The above-described program may realize part of the above-described functions or realize the above-described functions in combination with a program already recorded in the computer system.

As described in the foregoing, according to the present invention, a plurality of fingerprint images are taken from each finger to conduct fingerprint identification of these fingerprint image data with a group of fingerprint image data recorded in the registration data base.

As a result, the present invention produces an effect of expanding a range of applicable fingerprint image quality such that even with a finger whose fingerprint image quality is too low to determine coincidence and identification in conventional systems, determination can be made of coincidence and identification.

The present invention produces a further effect of enabling even a large-scale fingerprint registration data base to realize matching with a fingerprint image of lower quality by applying matching using a plurality of fingerprint images to each of different kinds of fingers.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A fingerprint identification system, comprising:
a fingerprint identification terminal which inputs a fingerprint image and transmits said fingerprint image, or feature vector data extracted from said fingerprint image, to a fingerprint identification device, said fingerprint identification device conducts fingerprint identification of said fingerprint image based on said feature vector data transmitted from said fingerprint identification terminal, wherein
said fingerprint identification terminal inputs a plurality of first fingerprint images obtained more than once for one finger, calculates image quality of said plurality of first fingerprint images, and transmits information of said image quality to said fingerprint identification device, and
wherein said fingerprint identification device:
selects a plurality of fingerprint images from said plurality of first fingerprint images based on said information of said image quality,
collates said feature vector data of a plurality of said selected first fingerprint images with feature vector data of one or more second fingerprint images stored in a fingerprint data base,
obtains a plurality of collating results for said plurality of collated first fingerprint images, and
conducts fingerprint identification determination based on said plurality of collating results for said plurality of collated first fingerprint images.

2. The fingerprint identification system as set forth in claim 1 wherein
said fingerprint identification terminal includes
a scanner interface unit having a function of receiving input of a plurality of fingerprint images per finger from an external fingerprint scanner device,
a main memory for holding said plurality of fingerprint images from said external fingerprint scanner device, and
a main control unit for calculating image quality of each of the plurality of fingerprint images held in said main memory, ranking the plurality of fingerprint images in said main memory in descending order of quality and selecting a preset number of high-quality images to calculate first feature vector data of a fingerprint from the selected high-quality fingerprint image.

3. The fingerprint identification system as set forth in claim 2, wherein
said fingerprint identification terminal includes
a communication input/output control unit having a function of transmitting said selected high-quality fingerprint image or the first feature vector data of the selected high-quality fingerprint image to said fingerprint identification device and a function of receiving identification result data returned from said fingerprint identification device.

4. The fingerprint identification system as set forth in claim 2, wherein
said fingerprint identification terminal includes:
a console display unit capable of displaying any of confirmation indication, processing state indication and fingerprint identification processing result indication of the plurality of fingerprint images stored in said main memory or an arbitrary combination of these indications, and
an input unit for receiving input for changing a display method of said console display unit and changing condition data for use in fingerprint identification which is set in advance in the processing of said main control unit.

5. The fingerprint identification system as set forth in claim 1, wherein
said fingerprint identification terminal includes
a scanner interface unit having a function of receiving input of a plurality of fingerprint images per finger from an external fingerprint scanner device,
a main memory for holding said plurality of fingerprint images, and
a main control unit for calculating image quality of each of the plurality of fingerprint images held in said main memory, ranking the plurality of fingerprint images in said main memory in descending order of quality and selecting a preset number of high-quality images to calculate first feature vector data of a fingerprint from the selected high-quality fingerprint image, and said fingerprint identification device receives input of the first feature vector data of each of the plurality of fingerprint images for one finger, and following a procedure predetermined according to the order of fingerprint image quality corresponding to each said fingerprint image, selects execution of either one-to-N matching or one-to-one matching between said first feature vector data and said second feature vector data, executes the selected matching processing, selects first feature vector data of a fingerprint image to be targeted next based on the determination whether each matching result satisfies preset conditions or not and repeats either one-to-N or one-to-one matching of the first feature vector data with said second feature vector data to output an identification result of the plurality of fingerprint images.

6. The fingerprint identification system as set forth in claim 1, wherein said fingerprint identification device receives input of the first feature vector data of each of the plurality of fingerprint images for one finger and conducts one-to-N matching of all of the first feature vector data with the second feature vector data to select only the identification scores that satisfy preset conditions starting with a score having the largest value, conducts fusion operation of the selected identification score with identification scores corresponding to a plurality of feature vector data of the same finger to calculate a fusion score, and outputs an identification result based whether the fusion score satisfies preset identification conditions.

7. The fingerprint identification system as set forth in claim 1, wherein said fingerprint identification device receives input of each feature vector data of a plurality of fingerprint image data for each of a plurality of fingers to output an identification result with a representative score calculated from said feature vector data of the plurality of fingerprint images of each finger in combination with a result of whether the representative score of each finger satisfies preset conditions.

8. The fingerprint identification system as set forth in claim 1, wherein said fingerprint identification device receives input of each feature vector data of a plurality of fingerprint image data for each of a plurality of fingers to obtain a representative score calculated from said feature vector data of the plurality of fingerprint images of each finger, and calculates a fusion score based on the representative score of each finger to output a result of whether the fusion score satisfies preset identification conditions as an identification result.

9. A fingerprint identification system as set forth in claim 1, wherein said fingerprint identification device selects a plurality of fingerprint images from said plurality of first fingerprint images according to said image quality in an order starting from highest quality image.

10. A fingerprint identification method in a fingerprint identification system comprising a fingerprint identification terminal which inputs a fingerprint image and transmits said fingerprint image, or feature vector data extracted from said fingerprint image, to a fingerprint identification device, said fingerprint identification device conducting fingerprint identification of said fingerprint image based on said feature vector data transmitted from said fingerprint identification terminal, comprising the steps of:

at said fingerprint identification terminal, inputting a plurality of first fingerprint images obtained more than once for one finger, calculating image quality of said plurality of first fingerprint images, and transmitting information of said image quality to said fingerprint identification device, and at said fingerprint identification device, selecting a plurality of fingerprint images from said plurality of first fingerprint images based on said information of said image quality, collating said feature vector data of a plurality of said selected first fingerprint images with feature vector data of one or more second fingerprint images stored in a fingerprint data base, obtaining a plurality of collating results for said plurality of collated first fingerprint images, and conducting fingerprint identification determination based on a plurality of collating results for said plurality of collated first fingerprint images.

11. The fingerprint identification method as set forth in claim 10, wherein said fingerprint identification terminal receives and displays identification result data of said fingerprint images obtained by said fingerprint identification device.

12. The fingerprint identification method as set forth in claim 10, wherein said fingerprint identification terminal, receives input of a plurality of fingerprint images per finger from an external fingerprint scanner device by a scanner interface unit, holds said plurality of fingerprint images in a main memory, calculates image quality of each of the plurality of fingerprint images held in said main memory, ranks the plurality of fingerprint images in said main memory according to said quality in descending order of quality to select a preset number of high-quality images, calculates first feature vector data of a fingerprint from said selected high-quality fingerprint image and sends said selected high-quality fingerprint image or the first feature vector data of the selected high-quality fingerprint image to said fingerprint identification device, and receives identification result data returned from said fingerprint identification device.

13. The fingerprint identification method as set forth in claim 10, wherein said fingerprint identification device receives input of the first feature vector data of each of the plurality of fingerprint images for one finger and conducts one-to-N matching of all of the first feature vector data with the second feature vector data to select only the identification scores that satisfy preset conditions starting with a score having the largest value, conducts fusion operation of the selected identification score with identification scores corresponding to a plurality of feature vector data of the same finger to calculate a fusion score, and outputs an identification result based whether the fusion score satisfies preset identification conditions.

14. The fingerprint identification method as set forth in claim 10, wherein
said fingerprint identification device
receives input of each feature vector data of a plurality of fingerprint image data for each of a plurality of fingers to output an identification result with a representative score calculated from said feature vector data of the plurality of fingerprint images of each finger in combination with a result of whether the representative score of each finger satisfies preset conditions.

15. The fingerprint identification method as set forth in claim 10, wherein
said fingerprint identification device
receives input of each feature vector data of a plurality of fingerprint image data for each of a plurality of fingers to obtain a representative score calculated from said feature vector data of the plurality of fingerprint images of each finger, and
calculates a fusion score based on the representative score of each finger to output a result of whether the fusion score satisfies preset identification conditions as an identification result.

16. A fingerprint identification method as set forth in claim 10, wherein
said fingerprint identification device selects a plurality of fingerprint images from said plurality of first fingerprint images according to said image quality in an order starting from highest quality image.

17. A computer-readable medium encoded with a fingerprint identification program in a fingerprint identification system comprising a fingerprint identification terminal which inputs a fingerprint image and transmits said fingerprint image, or feature vector data extracted from said fingerprint image, to a fingerprint identification device, said fingerprint identification device conducting fingerprint identification of said fingerprint image based on said feature vector data transmitted from said fingerprint identification terminal,
said fingerprint identification terminal to execute the functions of:
inputting a plurality of first fingerprint images obtained more than once for one finger, calculates image quality of said plurality of first fingerprint images, and
transmitting information of said image quality to said fingerprint identification device, and
said fingerprint identification device to execute the functions of:
selecting a plurality of fingerprint images from said plurality of first fingerprint images based on said information of said image quality,
collating said feature vector data of a plurality of said selected first fingerprint images with feature vector data of one or more second fingerprint images stored in a fingerprint data base,
obtaining a plurality of collating results for said plurality of collated first fingerprint images, and
conducting fingerprint identification determination based on a plurality of collating results for said plurality of collated first fingerprint images.

18. The computer-readable medium encoded with a fingerprint identification program as set forth in claim 17, which causes said fingerprint identification device to execute the functions of:
receiving input of the first feature vector data of each of the plurality of fingerprint images for one finger and conducting one-to-N matching of all of the first feature vector data with the second feature vector data to select only the identification scores that satisfy preset conditions starting with a score having the largest value,
conducting fusion operation of the selected identification score with identification scores corresponding to a plurality of feature vector data of the same finger to calculate a fusion score, and
outputting an identification result based whether the fusion score satisfies preset identification conditions.

19. The computer-readable medium encoded with a fingerprint identification program as set forth in claim 17, which causes said fingerprint identification device to execute the function of:
receiving input of each feature vector data of a plurality of fingerprint image data for each of a plurality of fingers to output an identification result with a representative score calculated from said feature vector data of the plurality of fingerprint images of each finger in combination with a result of whether the representative score of each finger satisfies preset conditions.

20. The computer-readable medium encoded with a fingerprint identification program as set forth in claim 17, which causes said fingerprint identification device to execute the function of:
receiving input of each feature vector data of a plurality of fingerprint image data for each of a plurality of fingers to obtain a representative score calculated from said feature vector data of the plurality of fingerprint images of each finger, and
calculating a fusion score based on the representative score of each finger to output a result of whether the fusion score satisfies preset identification conditions as an identification result.

21. The computer-readable medium encoded with a fingerprint identification program as set forth in claim 17, wherein said fingerprint identification device to execute the function of:
selecting a plurality of fingerprint images from said plurality of first fingerprint images according to said image quality in an order starting from highest quality image.

22. A fingerprint identification device which conducts fingerprint identification of a fingerprint image based on a feature vector data transmitted from a fingerprint identification terminal, said fingerprint identification terminal inputs a fingerprint image and transmits said fingerprint image, or feature vector data extracted from said fingerprint image, to said fingerprint identification device, wherein
said fingerprint identification terminal inputs a plurality of first fingerprint images obtained more than once for one finger, calculates image quality of said plurality of first fingerprint images, and transmits information of said image quality to said fingerprint identification device, and
said fingerprint identification device:
selects a plurality of fingerprint images from said plurality of first fingerprint images based on said information of said image quality received from said fingerprint identification terminal,
collates said feature vector data of a plurality of said selected first fingerprint images with feature vector data of one or more second fingerprint images stored in a fingerprint data base,
obtains a plurality of collating results for said plurality of collated first fingerprint images, and
conducts fingerprint identification determination based on a plurality of collating result for said plurality of collated first fingerprint images.

23. A fingerprint identification device as set forth in claim 22, wherein
said fingerprint identification device selects a plurality of fingerprint images from said plurality of first fingerprint images according to said image quality in an order starting from highest quality image.

24. The fingerprint identification device as set forth in claim 22, wherein
said fingerprint identification device receives input of the first feature vector data of each of the plurality of fingerprint images for one finger and conducts one-to-N matching of all of the first feature vector data with the second feature vector data to select only the identification scores that satisfy preset conditions starting with a score having the largest value,
conducts fusion operation of the selected identification score with identification scores corresponding to a plurality of feature vector data of the same finger to calculate a fusion score, and
outputs an identification result based whether the fusion score satisfies preset identification conditions.

25. The fingerprint identification device as set forth in claim 22, wherein
said fingerprint identification device receives input of each feature vector data of a plurality of fingerprint image data for each of a plurality of fingers to output an identification result with a representative score calculated from said feature vector data of the plurality of fingerprint images of each finger in combination with a result of whether the representative score of each finger satisfies preset conditions.

26. The fingerprint identification device as set forth in claim 22, wherein
said fingerprint identification device
receives input of each feature vector data of a plurality of fingerprint image data for each of a plurality of fingers to obtain a representative score calculated from said feature vector data of the plurality of fingerprint images of each finger, and
calculates a fusion score based on the representative score of each finger to output a result of whether the fusion score satisfies preset identification conditions as an identification result.

* * * * *